(12) United States Patent
Inoue

(10) Patent No.: US 7,532,745 B2
(45) Date of Patent: May 12, 2009

(54) IMAGE RECOGNITION SYSTEM AND RECOGNITION METHOD THEREOF, AND PROGRAM

(75) Inventor: Akira Inoue, Tokyo (JP)

(73) Assignee: Nec Corporation, Tokyo (JP)

( * ) Notice: Subject to any disclaimer, the term of this patent is extended or adjusted under 35 U.S.C. 154(b) by 451 days.

(21) Appl. No.: 10/373,167

(22) Filed: Feb. 26, 2003

(65) Prior Publication Data

US 2003/0161504 A1 Aug. 28, 2003

(30) Foreign Application Priority Data

| Feb. 27, 2002 | (JP) | ............................. | 2002-050644 |
| Sep. 19, 2002 | (JP) | ............................. | 2002-272601 |

(51) Int. Cl.
*G06K 9/00* (2006.01)
(52) U.S. Cl. ...................................... 382/118; 382/154
(58) Field of Classification Search ................. 382/118, 382/154, 284
See application file for complete search history.

(56) References Cited

U.S. PATENT DOCUMENTS

| 4,903,312 | A | * | 2/1990 | Sato ........................... 382/170 |
| 5,748,775 | A | * | 5/1998 | Tsuchikawa et al. ........ 382/190 |
| 6,243,492 | B1 | * | 6/2001 | Kamei ........................ 382/181 |
| 2003/0090593 | A1 | * | 5/2003 | Xiong ........................ 348/620 |
| 2003/0152274 | A1 | * | 8/2003 | McGrew ..................... 382/210 |
| 2006/0008150 | A1 | * | 1/2006 | Zhao et al. .................. 382/190 |

FOREIGN PATENT DOCUMENTS

| JP | 3-43877 A | 2/1991 |
| JP | 7-254062 | 10/1995 |
| JP | 7-287753 A | 10/1995 |
| JP | 1993-20442A A | 1/1996 |
| JP | 8-212353 A | 8/1996 |
| JP | 10-232938 A | 9/1998 |
| JP | 2000-30065 A | 1/2000 |
| JP | 2000-90190 A | 3/2000 |
| JP | 2000-259838 A | 9/2000 |
| JP | 2001-52182 A | 2/2001 |
| JP | 2001-236508 A | 8/2001 |
| JP | 2001-283216 A | 10/2001 |

OTHER PUBLICATIONS

Batur et al.; "Linear Subspaces for Illumination Robust Face Recognition", IEEE, 2001.*

(Continued)

*Primary Examiner*—John B Strege
(74) *Attorney, Agent, or Firm*—Sughrue Mion, PLLC

(57) ABSTRACT

A task is to correctly classify an input image regardless of a fluctuation in illumination and a state of occlusion of the input image.

Input image sub-region extraction means 2 extracts a sub-region of the input image. Inter-pattern distance calculation means 3 calculates an inter-pattern distance between this sub-region and a sub-region of a registration image pre-filed in dictionary filing means 5 for each sub-region. Region distance value integration means 10 integrates the inter-pattern distances obtained for each sub-region. This is conducted for the registration image of each category. Identification means 4 finds a minimum value out of its integrated inter-pattern distances, and in the event that its minimum value is smaller than a threshold, outputs a category having its minimum distance as a recognition result.

21 Claims, 20 Drawing Sheets

OTHER PUBLICATIONS

Fan et al.; "A combined feature-texture similarity measure for face alignment under varying pose", IEEE, 2000.*

Zhao et al.; "3D Model Enhanced Face Recognition", IEEE, 2000.*

Martinez; "Face Image Retrieval Using HMMs", IEEE Workshop on Content-Based Access of Images and Video Libraries, 1999.☐☐*

McGuire et al.; "Eigenpaxels and a Neural-Network Approach to image classification", IEEE Transactions on neural networks, vol. 12, No. 3, May 2001.*

Shan et al.; "Illumination normilazation for robust face recognition against varying lighting conditions", IEEE International Workshop on Analysis and Modeling of Faces and Gestures, 2003. ☐☐*

Cognitec Systems, The Technology of FaceVACS, http://www.cognitec-systems.de.*

3. E. Maeda et al., "Kernel Based Nonlinear Subspace Method for Pattern Recognition", Institute of Electronics, Information and Communication Engineers of Japan,, Collection, DII, vol. J82-D-II, No. 4, Apr. 1999, pp. 600-612.

* cited by examiner

IMAGE RECOGNITION SYSTEM AND RECOGNITION METHOD THEREOF, AND PROGRAM

BACKGROUND OF THE INVENTION

The present invention relates to a body recognition system employing an image and a recognition method thereof, and a record medium in which a recognition program was recorded, and more particular to an image recognition system for identifying whether an object body photographed in an image is a body registered in a dictionary, or for classifying it into one of a plurality of categories registered in a dictionary, and a recognition method thereof, and a program.

As one example of a conventional recognition system by an image, there is JP-P1993-20442A (FACE IMAGE COLLATING APPARATUS). This is an apparatus for collating a human face image, and an eigenvector of a Fourier spectrum pattern obtained by making a Fourier analysis of a whole image is employed for collation.

Also, in JP-P2000-30065A (PATTERN RECOGNITION APPARATUS AND METHOD THEREOF) was described a method of conducting collation by an angle (mutual subspace similarity) between a subspace to be found from a plurality of input images, and a subspace to be stretched by an image that was registered. A configuration view of one example of the conventional image recognition system is illustrated in FIG. 29. One example of the conventional image recognition system was configured of an image input section 210, an inter-subspace angle calculation section 211, a recognition section 212, and a dictionary storage section 213.

The conventional image recognition system having such a configuration operates as follows. That is, a plurality of the images photographed in plural directions are input by the image input section 210. Next, an angle between subspaces is calculated in the inter-subspace angle calculation section 211.

At first, an input image group is represented by a N-dimensional subspace. Specifically, the whole image is regarded as a one-dimensional feature data to make a principal-component analysis of it, and N eigenvectors are extracted. Dictionary data pre-represented by an M-dimensional subspace are prepared in the dictionary storage section 213 category by category. Further, an angle between a N-dimensional subspace of the input image, and an M-dimensional subspace of the dictionary is calculated in the inter-subspace angle calculation section 211 category by category. The recognition section 212 compares the angles calculated in the inter-subspace angle calculation section 211 to output a category of which an angle is minimum as a recognition result.

By taking a base vector of a dictionary subspace as $\Phi_m$ (m=1, ..., M), and a base vector of an input subspace as $\Psi_n$ (n=1, ..., N), a matrix X having x i j of Equation (1) or Equation (2) as an element is calculated.

(Numerical Equation 1)

$$X_{ij} = \sum_{m=1}^{M} (\psi_i \cdot \phi_m)(\phi_m \cdot \psi_j) \quad (1)$$

(Numerical Equation 2)

$$X_{ij} = \sum_{n=1}^{N} (\phi_i \cdot \psi_n)(\psi_n \cdot \phi_j) \quad (2)$$

The square of the cosine of an angle $\Theta$ between the subspaces can be found as a maximum eigenvalue of the matrix X. That the angle is small means that the square of the cosine is large. That is, the square of the cosine can be said in other word, i.e. a similarity of a pattern. The maximum eigenvalue of the matrix X is taken as a similarity in the conventional image recognition system to classify it into a category of which the similarity is maximum.

A point common to these conventional image recognition systems lies in that a similarity calculation or a distance calculation at the time of collation is operated only once by employing a feature extracted from the whole image.

However, in the event that a part of an object image was blackishly crushed due to a fluctuation in illumination, and in the event that occlusion occurred (in the event that one part of the object body got under cover), the problem existed that a feature amount acquired from the whole image became abnormal, whereby it was impossible to correctly conduct collation.

SUMMARY OF THE INVENTION

Thus, an objective of the present invention is to provide an image recognition system for correctly classifying the input image regardless of a fluctuation in illumination, and a state of occlusion.

In order to solve said tasks, an image recognition system in accordance with the present invention is characterized in including collation means for calculating an inter-pattern distance between a sub-region of an input image, and a sub-region of a registration image that corresponds hereto, and identifying said input image based on said inter-pattern distance of each sub-region.

Also, an image recognition method in accordance with the present invention is characterized in including a collation process of calculating an inter-pattern distance between a sub-region of an input image, and a sub-region of a registration image that corresponds hereto, and identifying said input image based on said inter-pattern distance of each sub-region.

Also, a program in accordance with the present invention is characterized in including a collation process of calculating an inter-pattern distance between a sub-region of an input image, and a sub-region of a registration image that corresponds hereto, and identifying said input image based on said inter-pattern distance of each sub-region.

In accordance with the present invention, it becomes possible to correctly classify the input image regardless of a fluctuation in illumination, and a state of occlusion.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Hereinafter, the embodiments of the present invention will be explained, referring to the accompanied drawings.

Figure 1:
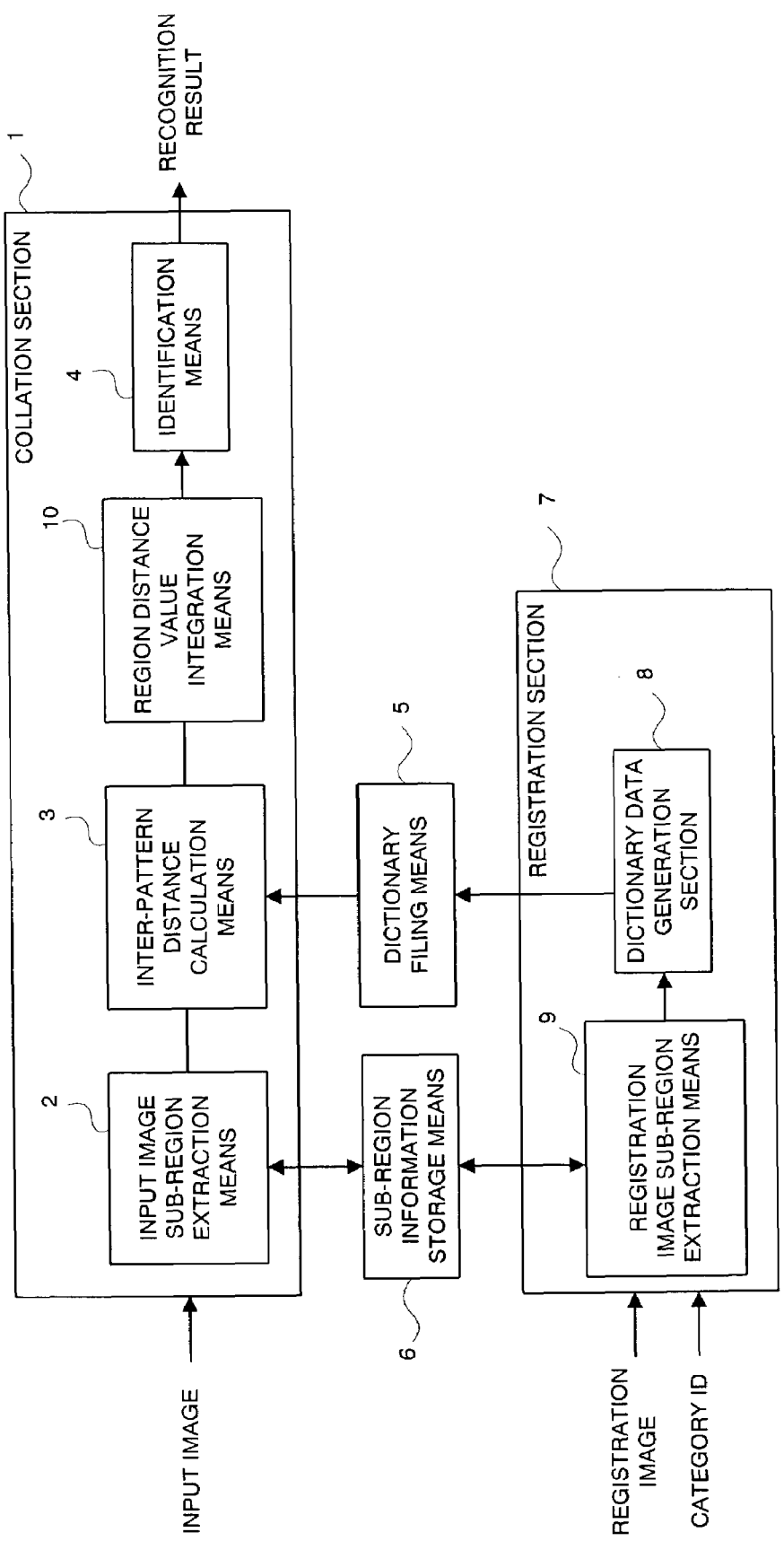
FIG. 1 is a configuration view of a first embodiment of an image recognition system relating to the present invention.

FIG. 1 is a configuration view of the first embodiment of the image recognition system relating to the present invention. By referring to the same figure, the image recognition system includes and is configured of a collation section 1 for recognizing an object from an input image, dictionary filing means 5 for filing a dictionary for use in collating, sub-region information storage means 6 that filed positional information for extracting a sub-region from the image, and a registration section 7 for generating a dictionary from the registration image.

In addition, in this specification, a human face image is listed as one example of the input image, and it is desirable that a position and size of the image of a face pattern are constant. Also, the input image represents not only a natural image having the real world photographed, but also a whole two-dimensional pattern including one which a space filter was caused to act on, and one generated by a computer graphics.

Next, the collation section 1 will be explained.

The collation section 1 is configured of input image sub-region extraction means 2, inter-pattern distance calculation means 3, region distance value integration means 10, and identification means 4.

The input image sub-region extraction means 2 establishes P (P is an integer equal to or more than 2) sub-regions for the image that was input, and calculates a by-region input feature vector, based on pixel values that belong to respective sub-regions. The input image sub-region extraction means 2 acquires information associated with the position, the size, and the shape of each sub-region from the sub-region information storage means 6 in establishing the sub-region for the image that was input. In addition, a feature vector, which takes the pixel value as an element, can be listed as one example of the by-region input feature vector; however an example of generating the other by-region input feature vectors will be described later.

Herein, establishment of the sub-region will be explained.

Figure 2:
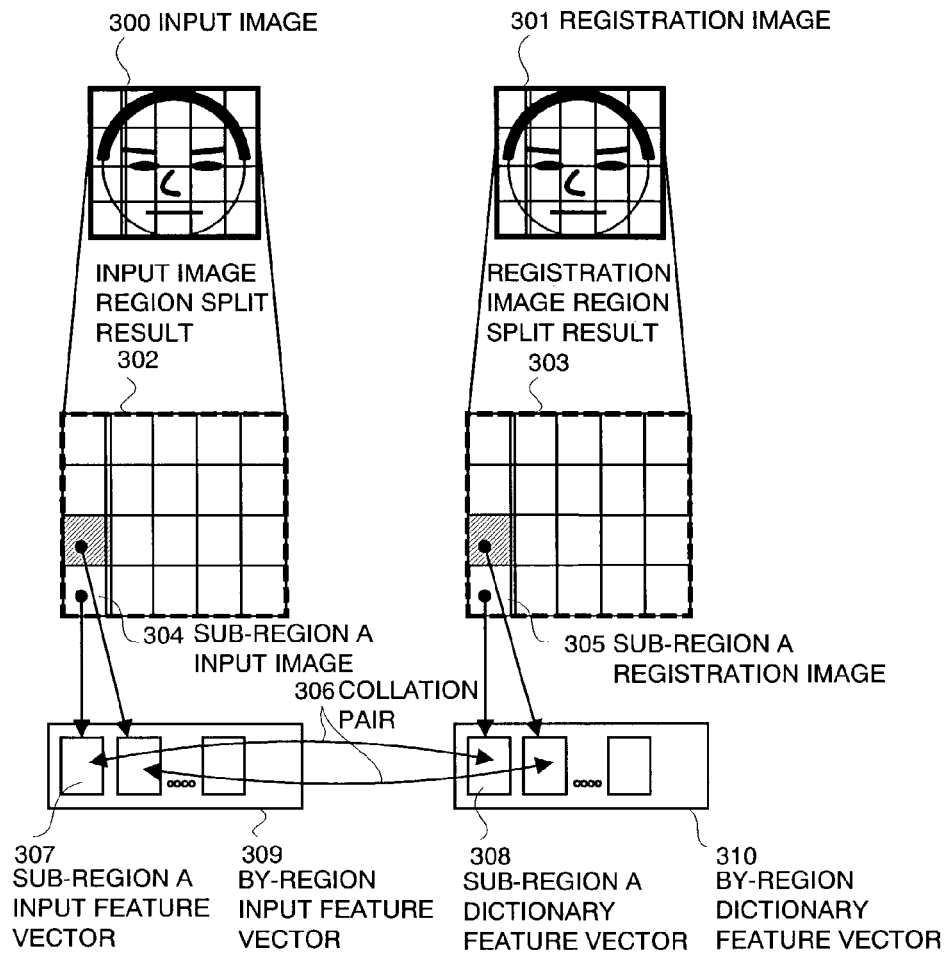
FIG. 2 is a conceptual view illustrating an inter-pattern distance calculation technique of the image recognition system relating to the present invention.

FIG. 2 is a conceptual view illustrating the inter-pattern distance calculation technique of the image recognition system relating to the present invention.

By referring to the same figure, an input image 300 is equally split into p rectangular sub-regions, and a input image region split result 302 is obtained. In the input image region split result 302, as one example, 20 rectangular sub-regions, of which size was equal, were arranged in such a manner that 5 pieces were in a horizontal direction and 4 pieces were in a vertical direction; however the shape of the sub-region is not always rectangular, but the sub-region may be defined in an elliptical shape and in an arbitrary closed curve. Also respective sizes do not need to be equal. Furthermore, respective sub-regions may be defined so that they are partially overlapped. In addition, the merit that an image processing is much simplified and its processing speed becomes higher exists on the side where, like the input image region split result 302, the rectangles of which size is equal are defined as sub-regions equally arranged in the whole image.

Also, as to the pixel number of the sub-region produced by splitting the input image 300, at least two or more pixels are required. Because a so-called one-pixel sub-region ends in having one pixel, its method becomes principally equal to a conventional one, and improvement in performance is impossible to achieve. In addition, the pixel number of the sub-region is desirably more than 16 pixels or something like it from an experimental result.

Next, an operation of the inter-pattern distance calculation means 3 will be explained.

The inter-pattern distance calculation means 3 employs the by-region input feature vector calculated in the input image sub-region extraction means 2, and dictionary data, which was registered sub-region by sub-region of each category, to calculate an inter-pattern distance between the input image and the registration image. The dictionary data is loaded from the dictionary filing means 5. The inter-pattern distance calculation means 3 calculates an intern-pattern distance value d p (p=1, . . . P) for each of p sub-regions.

Figure 3:
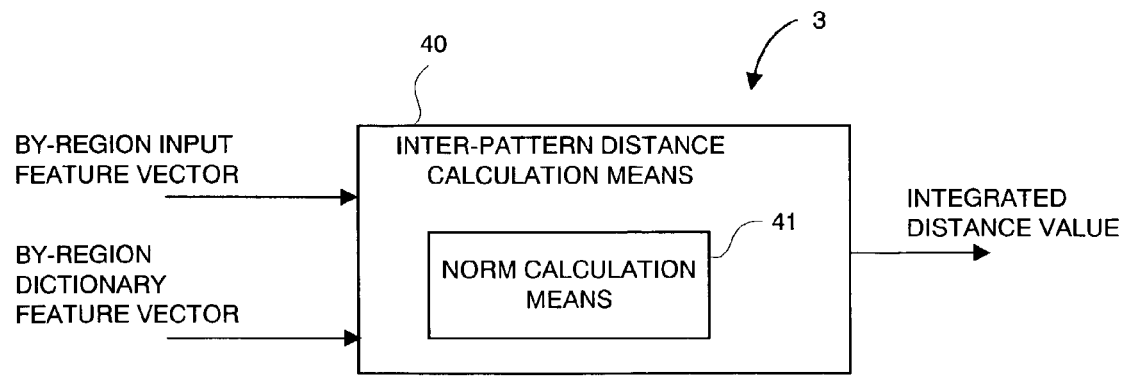
FIG. 3 is a configuration view of inter-pattern distance calculation means 40.

There is inter-pattern distance calculation means 40 shown in FIG. 3 as one example of the inter-pattern distance calculation means 3. By referring to the same figure, the inter-pattern distance calculation means 40 includes and is configured of norm calculation means 41. The norm calculation means 41 calculates a norm of a difference between an input feature vector x (i) and a dictionary feature vector y (i) sub-region by sub-region. There is an L2 norm as an example of the norm. The distance by the L2 norm is a Euclidean distance, and the calculation method thereof is illustrated in Equation (3), where the dimensional number of the vector is taken as n.

(Numerical Equation 3)

$$d_{L2} = \left[\sum_{j=1}^{n}(X(i)-y(i))^2\right]^{\frac{1}{2}} \quad (3)$$

There is an L1 norm as yet another example of the norm. The calculation method of the distance by the L1 norm is illustrated in Equation (4). The distance by the L1 norm is called an urban area distance.

(Numerical Equation 4)

$$d_{L1} = \left[\sum_{j=1}^{n}|X(i)-y(i)|\right] \quad (4)$$

Next, by employing FIG. 2, collation for each sub-region in the inter-pattern distance calculation means 40 will be explained. By referring to the same figure, the input image 300 is an image input as an identification object. A registration image 301 is an image pre-registered as an dictionary. The input image 300 is split into p sub-regions, and the input image region split result 302 is obtained. The registration image 301 is also split into p sub-regions, and a registration image region split result 303 is obtained.

The image data of the input image 300, which belongs to respective P sub-regions, is extracted as a one-dimensional feature vector, and stored as a by-region input feature vector 309. Now pay an attention to a sub-region A that is one out of P, a sub-region A input image 304 is converted into an input feature vector 307 of the sub-region A as a one-dimensional vector.

Similarly, the image data of the registration image 301, which belongs to respective P sub-regions, is extracted as a one-dimensional feature vector, and stored as a by-region dictionary feature vector 310. Now pay an attention to a sub-region A that is one out of P, a registration image 305 of the sub-region A is converted into a sub-region A dictionary feature vector 308 as a one-dimensional vector.

The inter-pattern distance calculation is operated sub-region by sub-region. For example, the sub-region A input feature vector 307 is compared with the sub-region A dictionary feature vector 308 to calculate a normed distance. In such a manner, the normed distance is independently calculated for all of P sub-regions.

Figure 4:
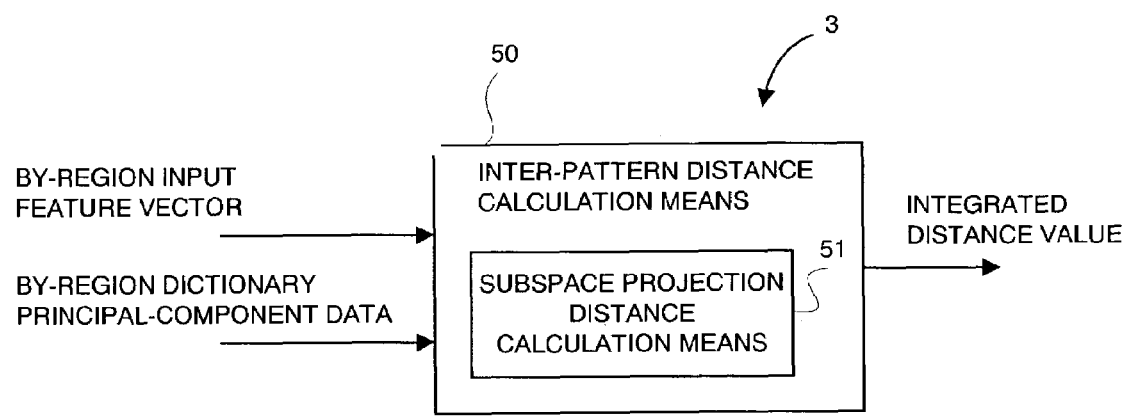
FIG. 4 is a configuration view of inter-pattern distance calculation means 50.

There is inter-pattern distance calculation means 50 of FIG. 4 as one example of the inter-pattern distance calculation means 3 other than the above-mentioned one. By referring to the same figure, the inter-pattern distance calculation means 50 includes and is configured of subspace projection distance calculation means 51. The subspace projection distance calculation means 51 calculates a subspace projection distance sub-region by sub-region.

A pattern matching by the subspace projection distance is called a subspace method, which was described, for example, in a document 1(Maeda, and Murase, "Kernel Based Nonlinear Subspace Method for Pattern Recognition", Institute of Electronics, Information and Communication Engineers of Japan, Collection, D-II, Vol. J82-D-II, No. 4, pp. 600-612, 1999) etc. The subspace projection distance is obtained by defining a distance value between a subspace that a dictionary-registered feature data group stretches, and an input feature vector. Herein, an example of the calculation method of the subspace projection distance is explained. An input feature vector is taken as X. A mean vector of a feature data group that was dictionary-registered is taken as V. The principal-component analysis is made of the dictionary-registered feature data group, and a matrix, which takes K eigenvectors of which the eigenvalue is larger as a string, is taken as $\Psi i (i=1, \ldots, K)$. In this statement, joined data of this mean vector V and the matrix $\Psi i$ by K eigenvectors is called principal-component data. At this moment a subspace projection distance ds is calculated by Equation (5).

(Numerical Equation 5)

$$d_S = \|X-V\|^2 - \sum_{i=1}^{K}\{\psi_i^T(X-V)\}^2 \quad (5)$$

Next, collation in the inter-pattern distance calculation means 50 for each sub-region will be explained by employing FIG. 5.

Figure 5:
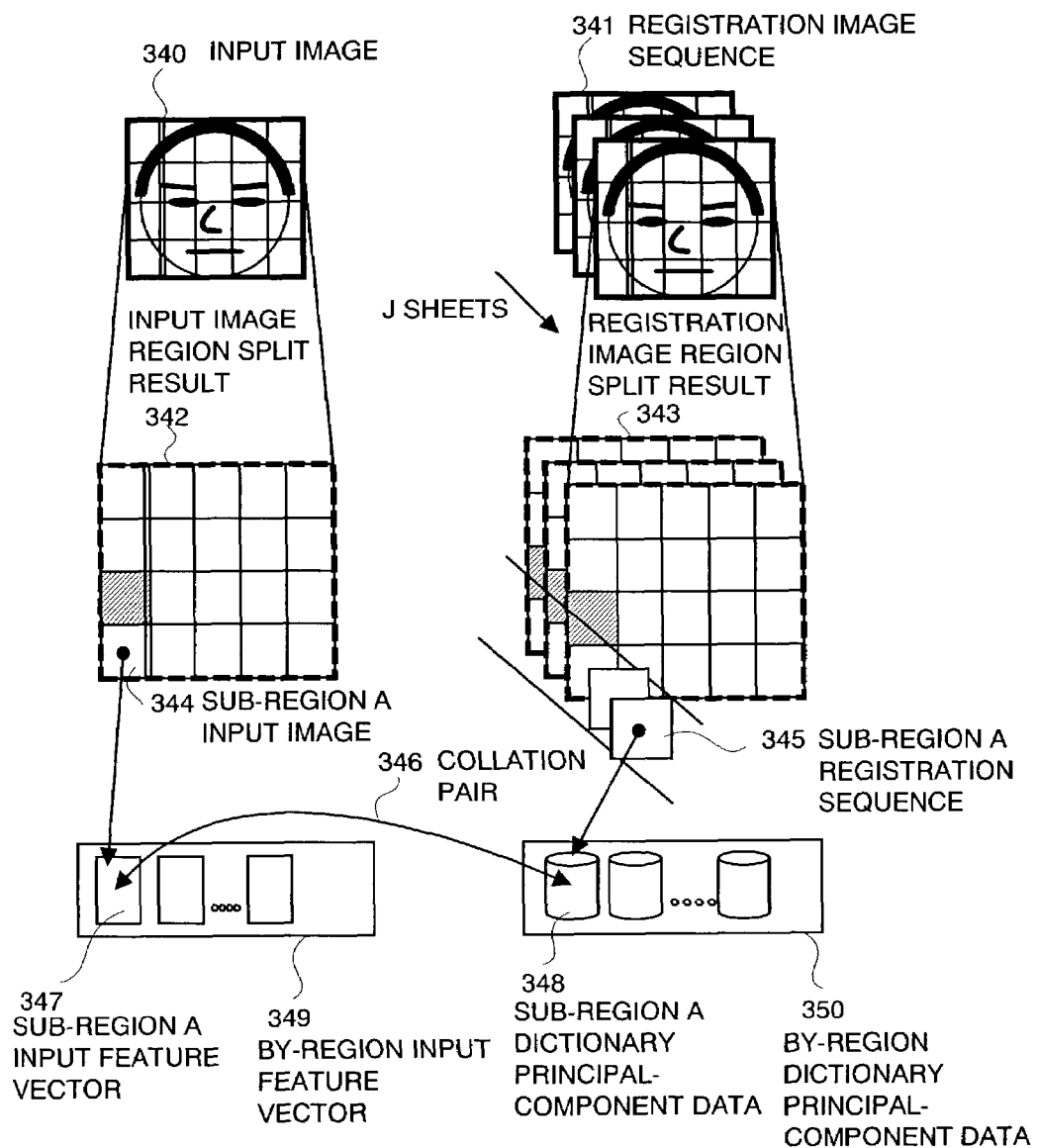
FIG. 5 is a conceptual view illustrating the inter-pattern distance calculation technique of the image recognition system relating to the present invention.

FIG. 5 is a conceptual view illustrating the inter-pattern distance calculation technique of the image recognition system relating to the present invention.

By referring to the same figure, an input image 340 is an image input as an identification object. A registration image sequence 341 is an image sequence pre-registered as a dictionary that belongs to one certain category. The registration image sequence 341 consists of J (J is an integer equal to or more than 2) registration images. The input image 340 is split into p sub-regions, and an input image region split result 342 is obtained. The registration image sequence 341 is also split into p sub-regions similarly, and a registration image region split result 343 is obtained.

The image data of the input image 340, which belongs to respective P sub-regions, is extracted as a one-dimensional feature vector, and stored as a by-region input feature vector 349. Now pay an attention to a sub-region A that is one out of P, a sub-region A input image 344 is converted into a sub-region A input feature vector 347 as a one-dimensional vector.

A one-dimensional feature vector is extracted for respective sub-regions from J images of the registration image sequence 341. Principal-component data is calculated from the J extracted feature vectors, and is stored as a by-region dictionary principal-component data 350. Now pay an attention to a sub-region A that is one out of P, a sub-region A registration sequence 345, which is a feature data string that belongs to the sub-region A, is employed to calculate sub-region A dictionary principal-component data 348.

The inter-pattern distance calculation is operated sub-region by sub-region. For example, the sub-region A input feature vector 347 is compared with the sub-region A dictionary principal-component data 348 to calculate a subspace projection distance. In such a manner, the subspace projection distance is independently calculated for all of P sub-regions.

Next, P distance values are employed category by category in the region distance value integration means 10 to cause a certain function F (d1, d2, d3, . . . , dp) to act on them, and to calculate one integrated distance value.

Figure 6:
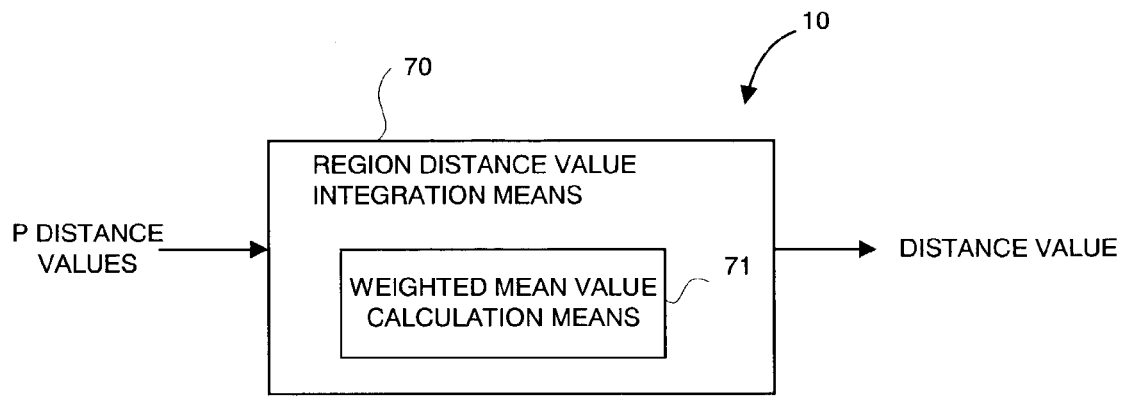
FIG. 6 is a configuration view of region distance value integration means 70.

There is region distance value integration means 70 of FIG. 6 as one example of the region distance value integration means 10. The region distance value integration means 70 includes and is configured of weighted mean value calculation means 71. When the region distance value integration means 70 is given P distance values of the sub-regions, the weighted mean value calculation means 71 calculates a weighted mean value D w of the P distance values to output it as an integrated distance value. A calculating equation of the weighted mean value Dw is shown in Equation (6).

(Numerical Equation 6)

$$Dw = \sum_{i=1}^{P} w_i \cdot d_j \qquad (6)$$

A pre-determined value can be employed for a weighting value W that corresponds to each region, and the weighting value may be found by causing a suitable function to act on the image data within the region.

Figure 7:
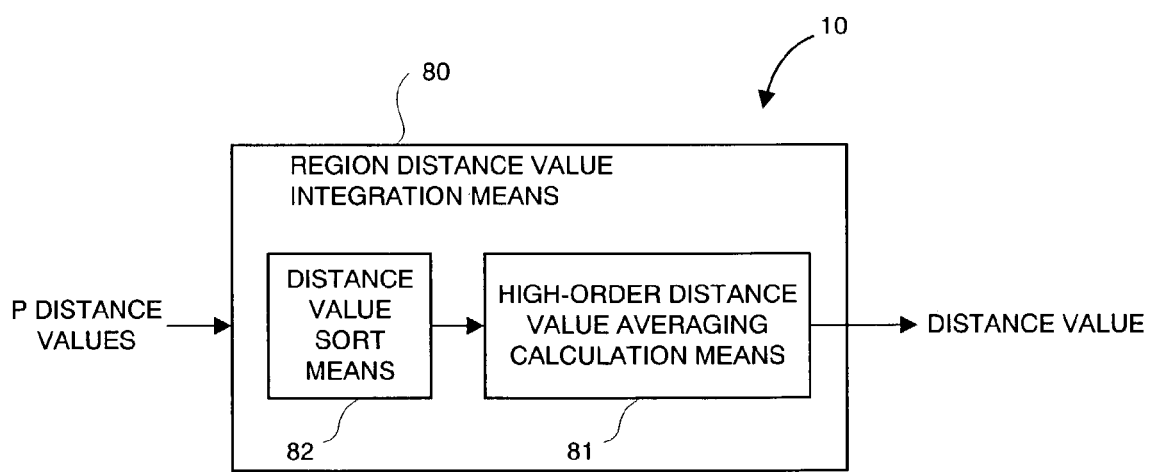
FIG. 7 is a configuration view of region distance value integration means 80.

Next, there is region distance value integration means 80 shown in FIG. 7 as one example of the region distance value integration means 10. The region distance value integration means 80 is configured of distance value sort means 82, and high-order distance value averaging calculation means 81. When the region distance value integration means 80 is given P distance values of the sub-regions, it sorts out the P distance values in order of smallness in the distance value sort means 82, and calculates a mean value Dp of P' (P' is an integer less than P) distance values of the sub-regions, which are smaller, in the high-order distance value averaging calculation means 81 to output it as an integrated distance value. As to the value of P', there is a method of pre-determining it responding to the value of P. Also, there is a method of dynamically varying the value of P', by defining P' as a function of the distance value of each sub-region. Also the value of P' can be made variable responding to brightness and contrast of the whole image.

Also, as one example of the region distance value integration means 10, there is means of calculating a mean value of P' (P' is an integer less than P) distance values of the sub-regions smaller than a threshold pre-given in the distance values of P sub-regions.

Figure 8:
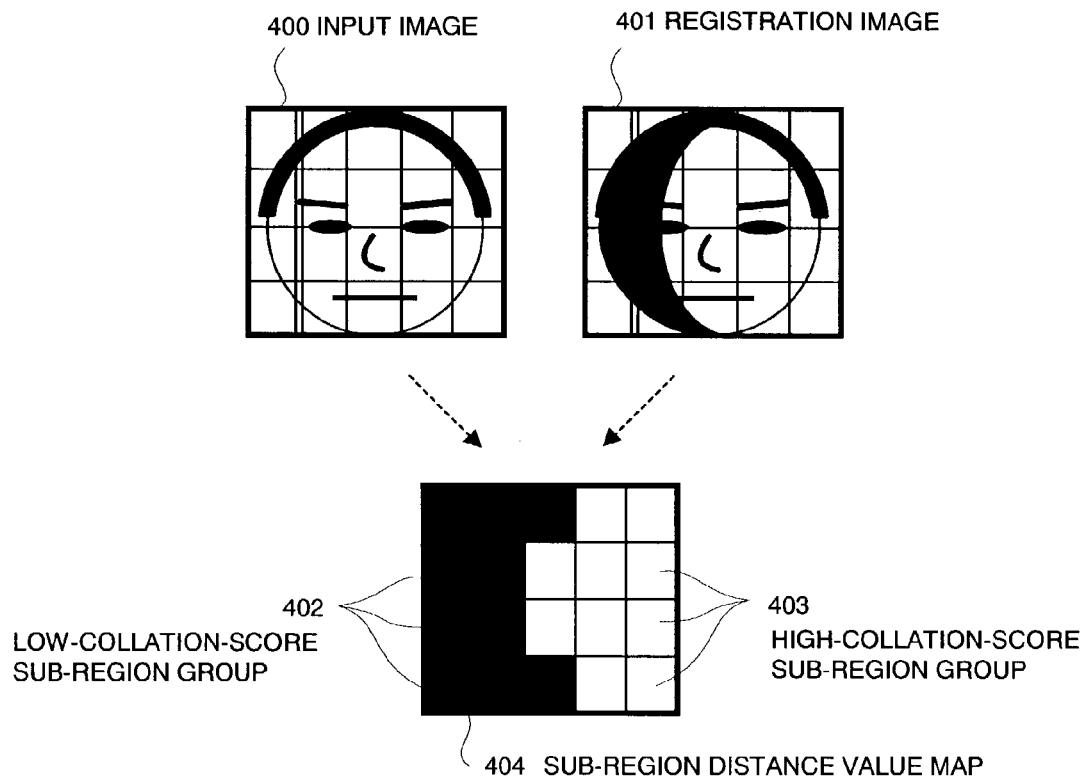
FIG. 8 is a conceptual view illustrating the inter-pattern distance calculation technique of the image recognition system relating to the present invention.

Next, the merit of the method of employing only the distance values of the sub-region that are smaller to calculate the integrated distance in the region distance value integration means 80 will be explained by employing FIG. 8. FIG. 8 is a conceptual view illustrating the inter-pattern distance calculation technique of the image recognition system relating to the present invention. Now consider a comparison of an input image 400 and a registration image 401. The registration image 401 has a shadow due to an influence of illumination in the left side thereof, and the left-side image pattern thereof is greatly different from that of the input image 400. When a result obtained by calculating the distance value sub-region by sub-region is shown with a variable density value in the figure, a sub-region distance value map 404 is obtained. The distance value is large in the black region (a collation score is low), and the distance value is small in the white region (a collation score is high). The collation score of the sub-region in the left side of the registration image having a shadow cast comes to be low. Intuitively, it is seen that a more exact collation result can be obtained by neglecting the obscure left-side sub-region, and making collation with only the right-side sub-region. Therefore, like the region distance value integration means 80, the distance value integration means considering only the sub-region of which the collation score is high (the distance value is low) is effective.

Figure 9:
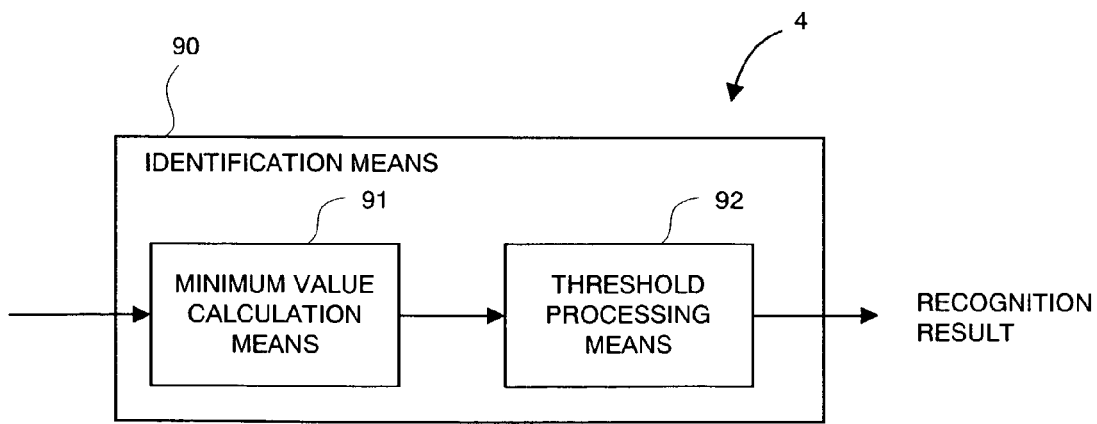
FIG. 9 is a configuration view of identification means 90.

Next, the identification means 4 compares the distance values integrated into each category, which were obtained from the region distance value integration means 10, to finally output a category to which the input image belongs. There is identification means 90 shown in FIG. 9 as one example of the identification means 4. By referring to the same figure, the identification means 90 includes and is configured of minimum value calculation means 91, and threshold processing means 92. At first, the minimum value of the distance values integrated into each category is calculated in the minimum value calculation means 91. Next, the minimum value is compared with the threshold in the threshold processing means 92, and when the minimum value is smaller than the threshold, a category in which the minimum value was obtained is output as an identification result. When the minimum value is larger than the threshold, a result that no category exists in the dictionary is output.

Next, an operation of the registration section 7 will be explained. The registration section 7 includes and is configured of registration image sub-region extraction means 9, and dictionary data generation means 8. The registration image and an ID (Identification) of a category that corresponds hereto are input into the registration section 7. This image is taken as an image that belongs to the category designated by the category ID. The registration image sub-region extraction means 9 establishes P sub-regions for the registration image by referring to the sub-region information storage means 6, and generates a by-region dictionary feature vector based on the pixel values that belong to respective sub-regions. The feature vector, which takes the pixel value as an element, can be listed as one example of the by-region dictionary feature vector. An example of generating the other by-region dictionary feature vectors will be described later.

And the by-region dictionary feature vector is converted into an appropriate reserve format in the dictionary data generation means 8 to output it to the dictionary filing means 5. In the event that principal-component data is required as a dictionary, a principal-component analysis is conducted of a dictionary feature vector group. One example of the reserve format is illustrated in FIG. 10.

Figure 27:
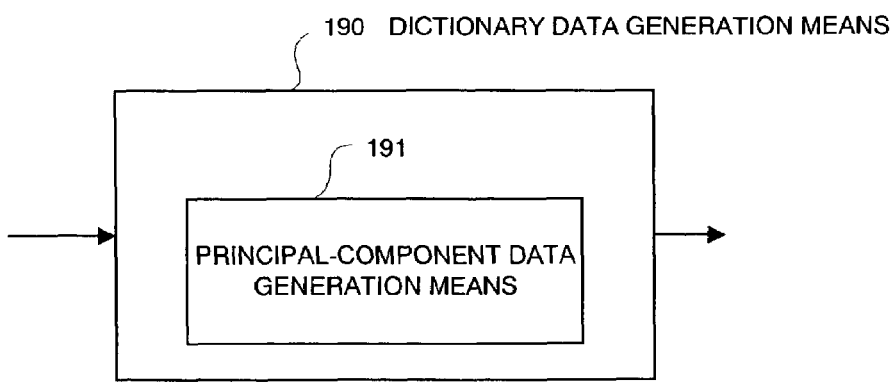
FIG. 27 is a configuration view of dictionary data generation means 190.

There is dictionary data generation means 190 of FIG. 27 as one example of the dictionary data generation means 8. The dictionary data generation means 190 includes principal-component data generation means 191. The principal-component data generation means 191 conducts a principal-component analysis of a plurality of the by-region dictionary feature vector groups, which were input, to generate by-region principal-component data.

Figure 10:
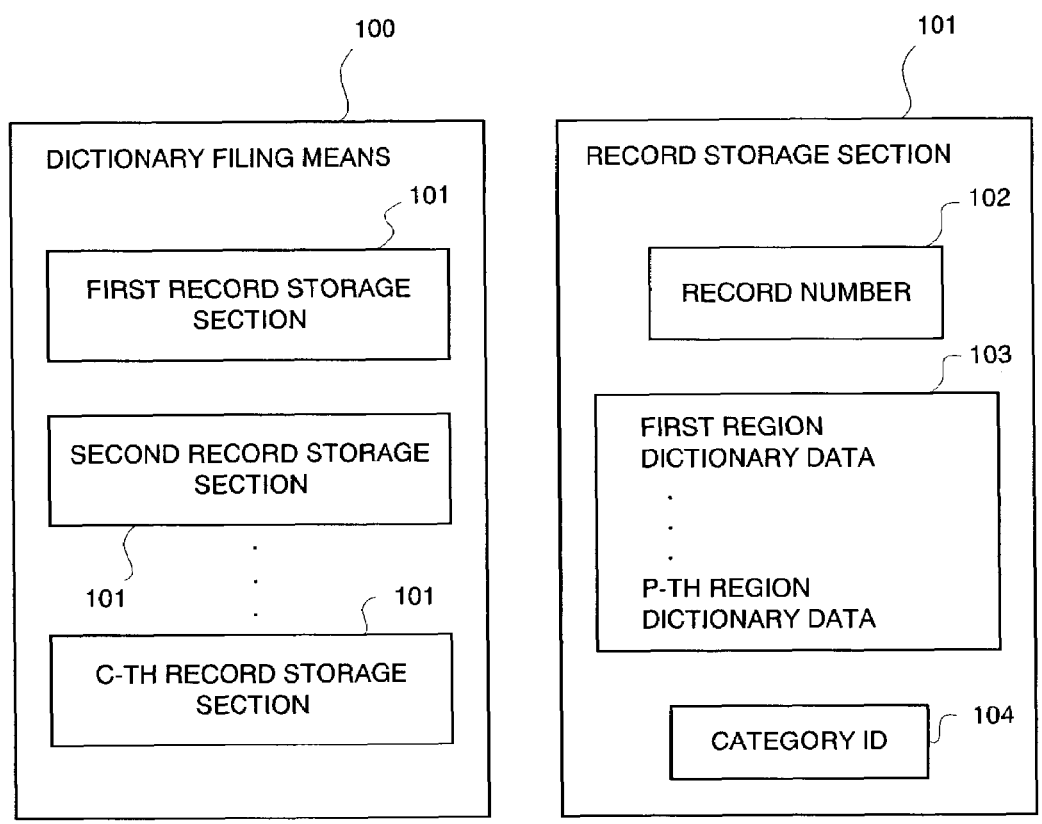
FIG. 10 is a configuration view of dictionary filing means 100.

A configuration view of the dictionary filing means 100 that is one example of the dictionary filing means 5 is illustrated in FIG. 10. 100 of FIG. 10 is a whole configuration view of the dictionary filing means, and 101 of FIG. 10 is a configuration view of the record storage section. The dictionary filing means 100 has C record storage sections 101, and a record number 102, by-region dictionary data 103, and a category ID 104 can be stored in each record. The by-region dictionary data consists of P kinds of dictionary data by sub-region. It is possible for the dictionary filing means 100 to file a plurality of the dictionary records having the same category ID. Specific data of the by-region dictionary data 103 depends upon the distance calculation technique of the inter-pattern distance calculation means 3, for example, when the inter-pattern distance calculation means 40 is employed, it becomes a one-dimensional feature vector, and when the inter-pattern distance calculation means 50 and the inter-pattern distance calculation means 60 are employed, it becomes principal-component data consisting of a mean vector V and K eigenvectors.

Figure 11:
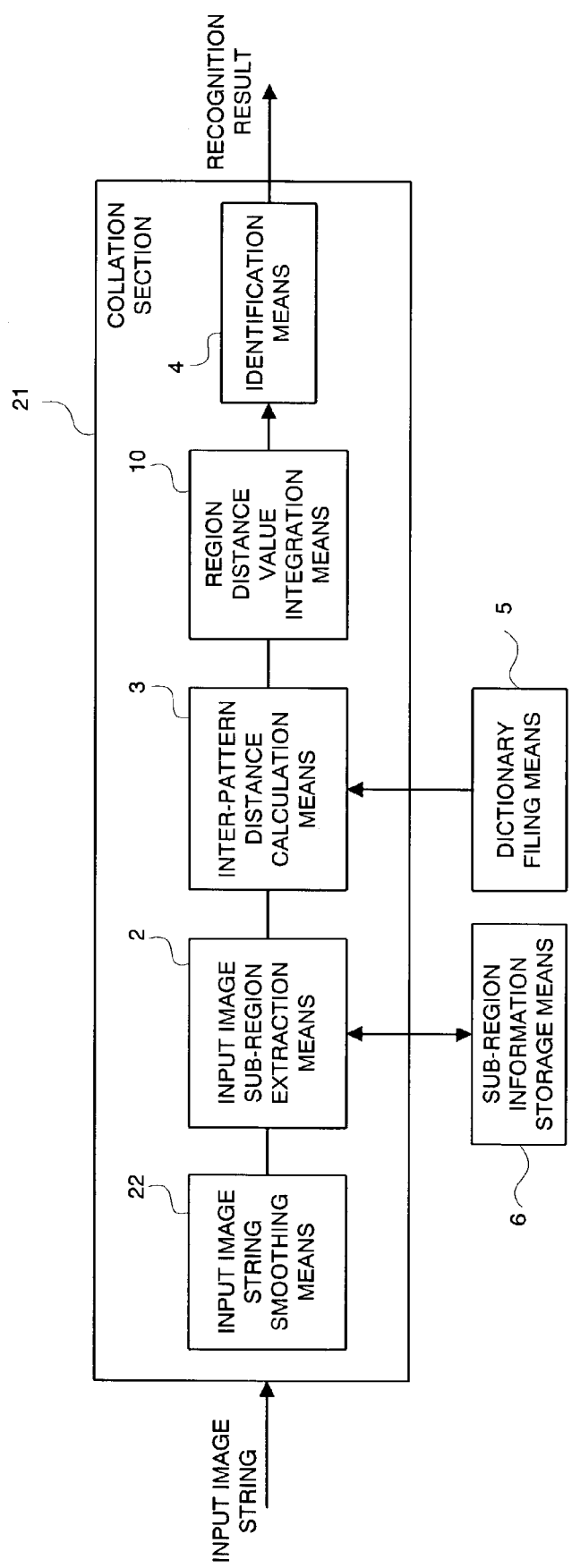
FIG. 11 is a configuration view of a collation section 21.

A configuration of a collation section 21 for recognizing an object from a plurality of sheets of the input images such as a video sequence, which is an embodiment, is illustrated in FIG. 11. Moving images such as a video picture, and a plurality of sheets of static images having the same body photographed are included as the input of this embodiment. In addition, the identical number is affixed to the configuration part similar to that of FIG. 1, and its explanation is omitted. The collation section 21 includes and is configured of input image sequence smoothing means 22 for averaging an input image sequence to generate one sheet of an input image, the input image sub-region extraction means 2, the inter-pattern distance calculation means 3, and the identification means 4. When N (N is an integer equal to or more than 2) sheets of the input images are input at first, the collation section 21 averages N sheets pixel by pixel to generate one sheet of the mean input image. The collation section 21 takes this mean input image as an input image to conduct an identical operation to the collation section 1.

Figure 12:
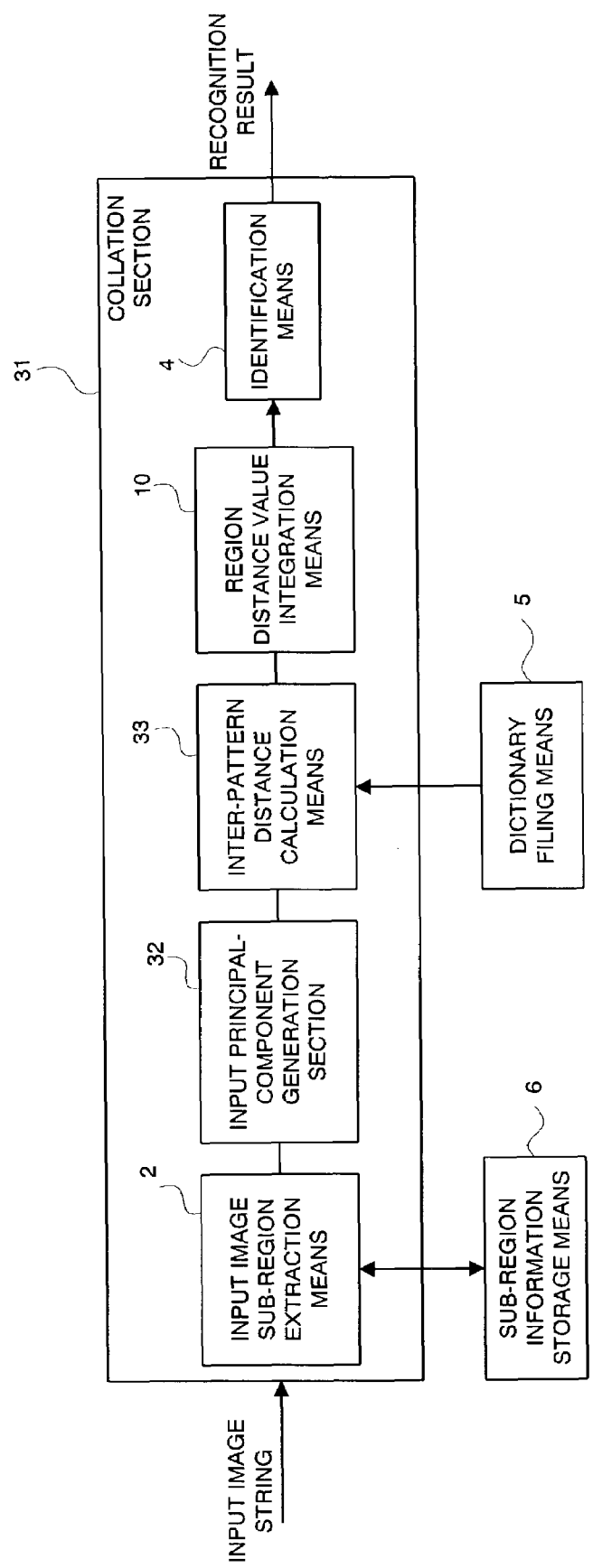
FIG. 12 is a configuration view of a collation section 31.

A configuration of a collation section 31 for recognizing an object from a plurality of sheets of the input images such as a video sequence, which is another embodiment, is illustrated in FIG. 12. The moving images such as a video picture, and a plurality of sheets of the static images having the same body photographed are included as the input of this embodiment. In addition, the identical number is affixed to the configuration part similar to that of FIG. 1, and its explanation is omitted. The collation section 31 includes and is configured of the input image sub-region extraction means 2, an input principal-component generation section 32, inter-pattern distance calculation means 33, and the identification means 4. When N sheets of the input images are input, the collation section 31 establishes P sub-regions for each image in the input image sub-region extraction means 2, and extracts the image data that belongs to respective sub-regions. Information associated with the position, the size, and the shape of each sub-region is acquired from the sub-region information storage means 6 in establishing the sub-region. Next, by-region input principal-component data, which is input principal-component data by sub-region, is calculated in the input principal-component generation section 32. In the inter-pattern distance calculation means 33, P kinds of the obtained input principal-component data, and the dictionary data are employed to calculate a distance value to each category. Based on the distance value to each category, it is determined in the identification means which category the input image sequence belongs to, and a recognition result is output.

Figure 13:
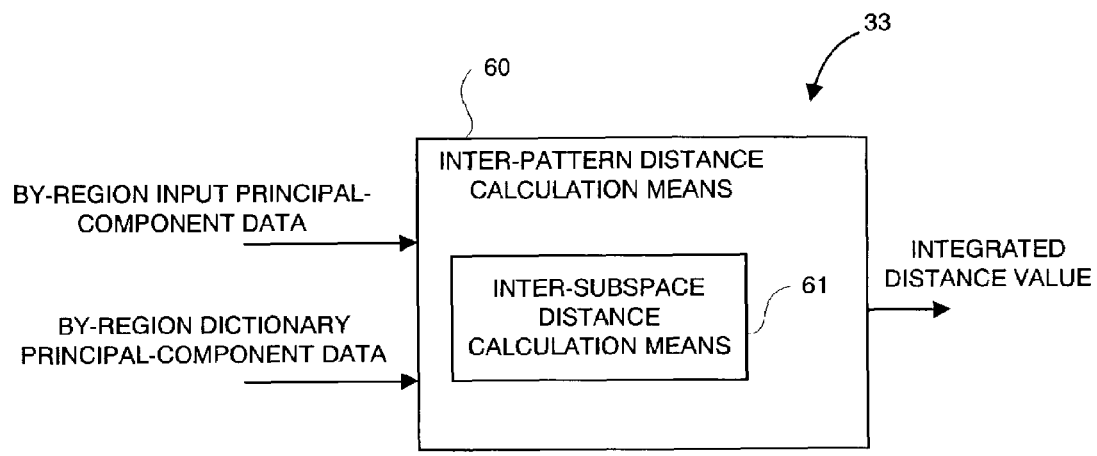
FIG. 13 is a configuration view of inter-pattern distance calculation means 60.

There is inter-pattern distance calculation means 60 shown in FIG. 13 as an example of the inter-pattern distance calculation means 33. The inter-pattern distance calculation means 60 is configured of inter-subspace distance calculation means 61. The inter-subspace distance calculation means 61 takes the by-region input principal-component data and the by-region dictionary principal-component data as the input to calculate the distance value sub-region by sub-region.

There is a method of finding a distance between subspace companions as a realizing method of the inter-subspace distance calculation means 61. One example is described below. The dictionary principal-component data consists of a dictionary mean vector V1 and K dictionary eigenvectors Ψi. The input principal-component data consists of an input mean vector V2 and L input eigenvectors Φi. At first, a distance value dM1 between the input mean vector V2 and the subspace to be stretched by the dictionary eigenvector is calculated by Equation (7).

(Numerical Equation 7)

$$dM1 = \|V_2 - V_1\|^2 - \sum_{i=1}^{K} \{\psi_i^T(V_2 - V_1)\}^2 \tag{7}$$

Next, a distance value dM2 between the dictionary mean vector V1 and the subspace to be stretched by the input eigenvector is calculated by Equation (8).

(Numerical Equation 8)

$$dM2 = \|V_2 - V_1\|^2 - \sum_{i=1}^{L} \{\phi_i^T(V_2 - V_1)\}^2 \tag{8}$$

A distance between the subspace companions of the input and the dictionary is calculated with a function G (dM1 and dM2) of dM1 and dM2.

There is Equation (9) etc. as one example of the function G.

(Numerical Equation 9)

$$D = \alpha \frac{d_1 \cdot d_2}{d_1 + d_2}, \tag{9}$$

where α is a constant.

Figure 14:
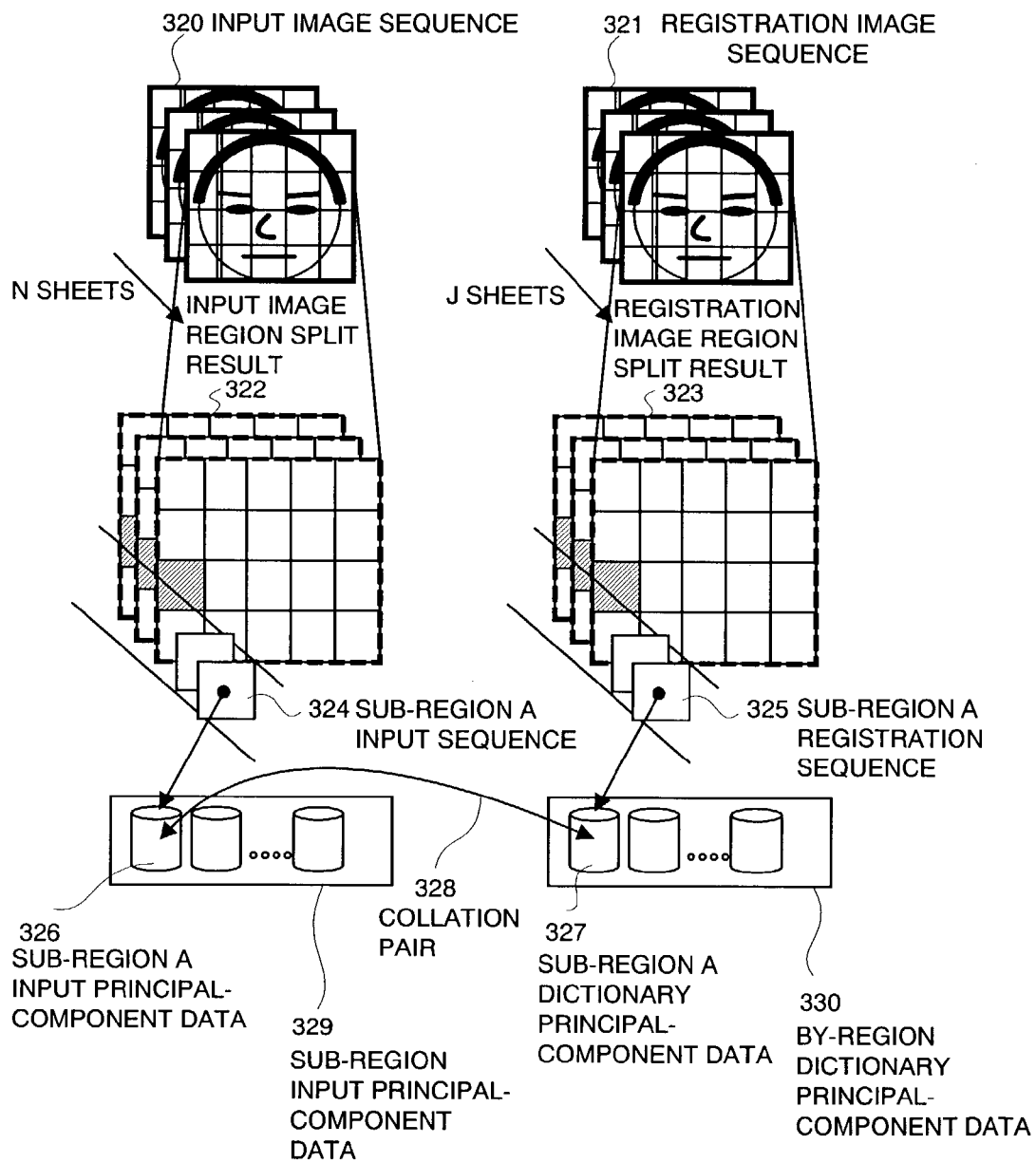
FIG. 14 is a conceptual view illustrating the inter-pattern distance calculation technique of the image recognition system relating to the present invention.

Next, collation in the inter-pattern distance calculation means 60 for each sub-region will be explained by employing FIG. 14. FIG. 14 is a conceptual view illustrating the inter-pattern distance calculation technique of the image recognition system relating to the present invention. By referring to the same figure, an input image sequence 320 is an image sequence input as an identification object. A registration image sequence 321 is an image sequence pre-registered as a dictionary that belongs to one certain category. The input image sequence consists of N sheets of the input images, and the registration image sequence 321 consists of J sheets of the registration images. Each image of the input image sequence 320 is split into P sub-regions, and an input image region split result 322 is obtained. The registration image sequence 321 is also split into p sub-regions similarly, and a registration image region split result 323 is obtained.

The one-dimension feature vector is extracted from N sheets of the images of the input image sequence 320 for each of P sub-regions. The principal-component data is calculated from the extracted N feature vectors, and stored as by-region input principal-component data 329. Now pay an attention to a sub-region A that is one out of P regions, sub-region A input principal-component data 326 is calculated by employing a sub-region A input sequence 324 that is a feature data string that belongs to the sub-region A.

On the other hand, the one-dimension feature vector is extracted from J sheets of the images of the registration image sequences 321 for each of P sub-regions. The principal-component data is calculated from the extracted J feature vectors, and stored as a by-region dictionary principal-component data 330. Now pay an attention to a sub-region A that is one out of P regions, sub-region A dictionary principal-component data 327 is calculated by employing a sub-region A registration sequence 325 that is a feature data string that belongs to the sub-region A.

The inter-pattern distance calculation is operated sub-region by sub-region. For example, the sub-region A input principal-component data 326 is compared with the sub-region A dictionary principal-component data 327, and an inter-subspace distance is calculated, for example, by an Equation (9). The inter-subspace distance is independently calculated for all of P sub-regions.

Figure 18:
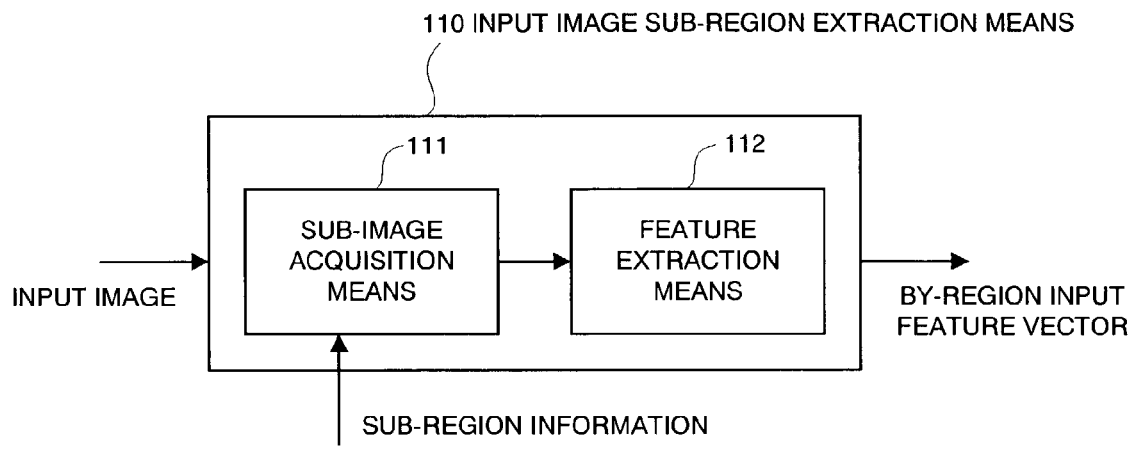
FIG. 18 is a configuration view of input image sub-region extraction means 110.

Next, the input image sub-region extraction means 2 will be explained in detail. There is input image sub-region extraction means 110 of FIG. 18 as one example of the input image sub-region extraction means 2.

Figure 19:
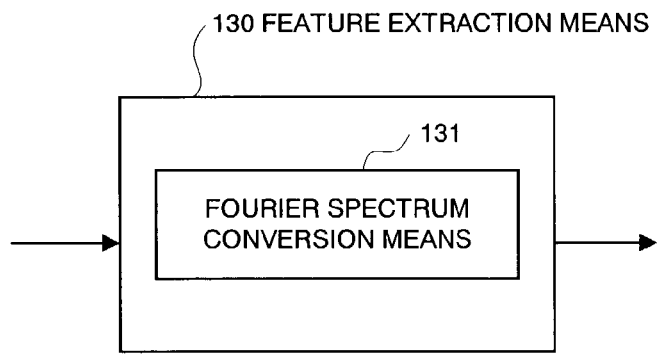
FIG. 19 is a configuration view of feature extraction means 130.

The input image sub-region extraction means 110 includes sub-image acquisition means 111 and feature extraction means 112. The sub-image acquisition means 111 makes a reference to sub-region information filed in the sub-region information storage means 6 to acquire a pixel value of a sub-image. The feature extraction means 112 converts the obtained sub-image data into a one-dimensional feature vector. There is means for generating a vector, which takes the pixel value of the sub-image as an element, as an example of the feature extraction means 112. Also as an example of the feature extraction means 112, there is means for taking as a feature vector a vector obtained by applying a compensating process such as a density-normalization of the pixel value, a histogram-flattening, and a filtering for the pixel value of the sub-image. Also, there is means for extracting a frequency feature utilizing a Fourier transform, a DCT, and a wavelet transformation. The frequency feature is generally tough against misregistration. Additionally, the conversion into the frequency feature is one kind of the filtering against a pixel value vector. There is feature extraction means 130 shown in FIG. 19 as one example of the feature extraction means 112 that outputs the frequency feature. The feature extraction means 130 includes Fourier spectrum conversion means 131. The Fourier spectrum conversion means 131 conducts a discrete Fourier transform for the vector of the pixel value of the sub-region. The feature extraction means 130 outputs the feature vector that takes a discrete Fourier transform factor of the pixel value as an element.

Figure 20:
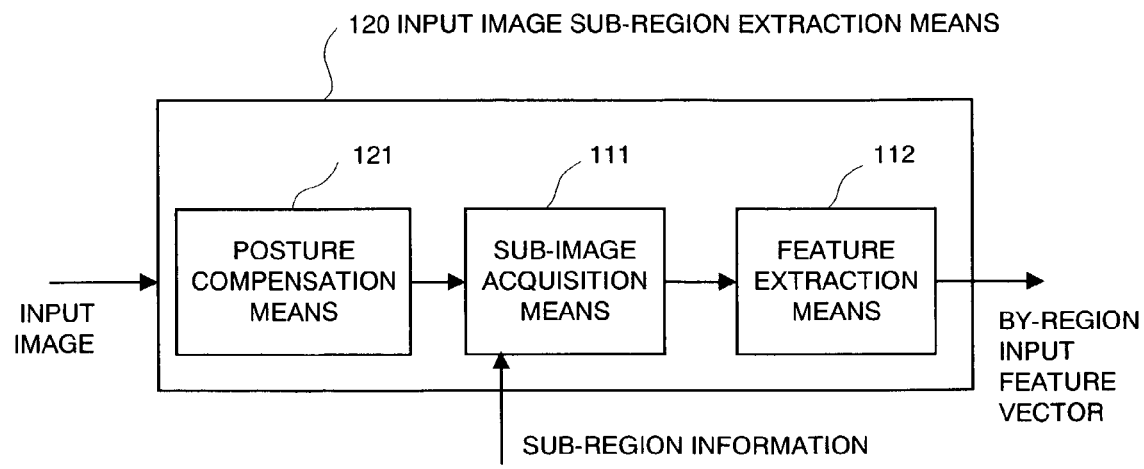
FIG. 20 is a configuration view of input image sub-region extraction means 120.

There is input image sub-region extraction means 120 of FIG. 20 as another example of the input image sub-region extraction means 2. The input image sub-region extraction means 120 includes posture compensation means 121, the sub-image acquisition means 111 and the feature extraction means 112. The input image sub-region extraction means 120 appropriately compensates for posture of the body in the input image before extracting the feature by the posture compensation means 121. To compensate for the posture of the body in the input image, specifically, is to convert the input image data itself so that the body in the input image comes to be in a state of being observed by a camera in a predetermined fixed direction. A by-region input feature vector is generated by the posture compensation means 121, by employing the sub-image acquisition means 111 and the feature extraction means 112 for the input data converted to assume a constant posture. Compensation of the posture of the input image allows deterioration in collation precision due to a variation in posture of the body in the image to be improved. Also, by compensating for the image on the registration side into the image having the posture of the same parameter as the input, collation precision can be improved.

Figure 21:
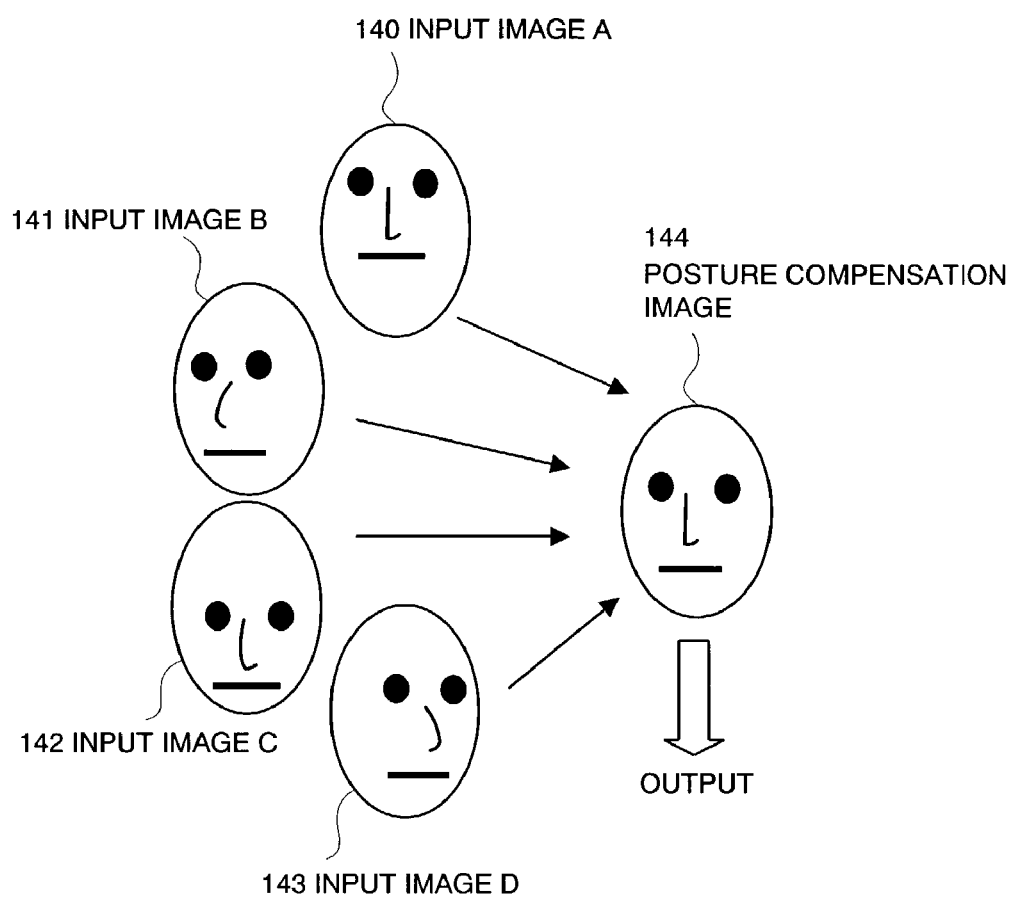
FIG. 21 is a conceptual view illustrating a posture compensation method.

A posture compensation method will be explained by referring to FIG. 21. In general, the parameter of the posture compensation totals 6 of movements along X Y Z axes and rotations around X Y Z axes. By taking the face image as an example in FIG. 21, the face images that pointed to various directions are illustrated as the input image. An input image A 140 points upward, an input image B 141 points to the right, an input image C 142 points downward, and an input image D 143 points to the left. On the other hand, a posture compensation image 144 is an image obtained by converting said input image into an image that points to the front.

There is a method of conducting an afine transformation of the image data as one example of such a posture compensation method as the conversion of the input image into said posture compensation image 144. The method of compensating for the posture of the body by the afine transformation was disclosed, for example, in JP-P2000-90190A.

Figure 22:
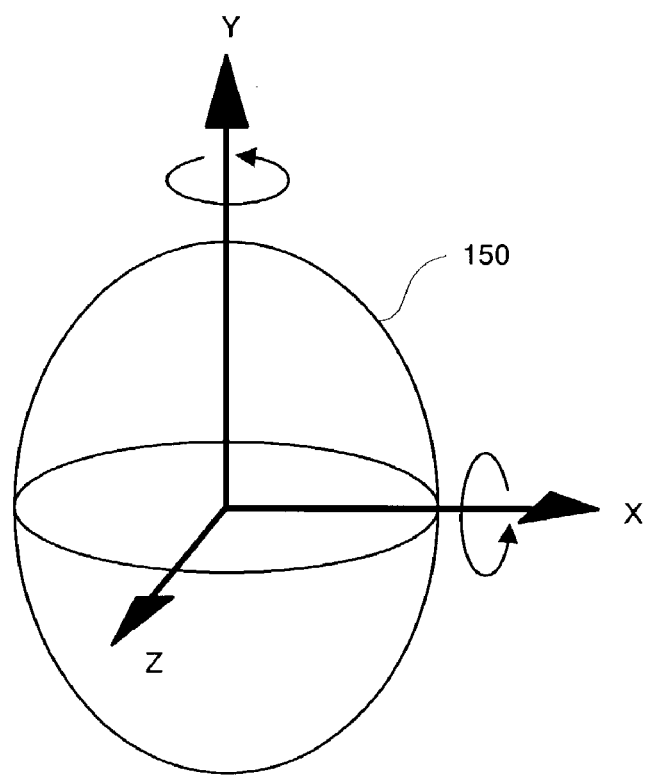
FIG. 22 is a view illustrating one example of an ellipsoidal model.
Figure 23:
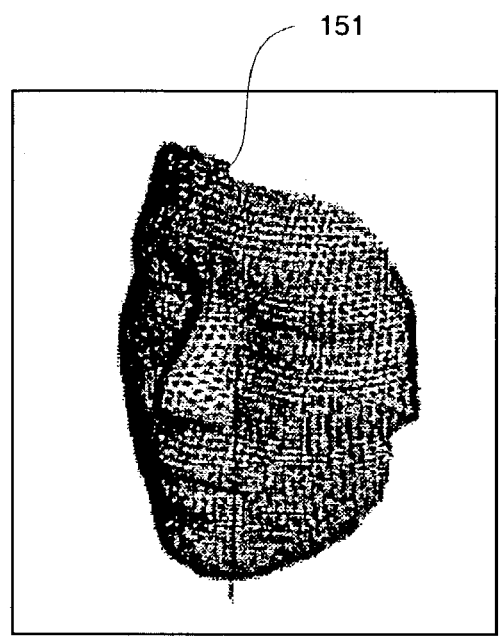
FIG. 23 is a view illustrating one example of a standard three-dimensional face model.

Also, there is a method of making use of a three-dimensional model shown in FIG. 22 and FIG. 23 as one example of the other posture compensation methods. The three-dimensional model assumed to be a human face is illustrated in FIG. 22 and FIG. 23. FIG. 22 illustrates an ellipsoidal model 151, and FIG. 23 illustrates a standard three-dimensional face model 152. The standard three-dimensional face model, which is a three-dimensional model representing a shape of a standard human face, can be obtained by utilizing three-dimensional CAD software and a measurement by a range finder. It is possible to realize the posture compensation by moving and rotating the three-dimensional model after texture-mapping the input image on the three-dimensional model.

Figure 24:
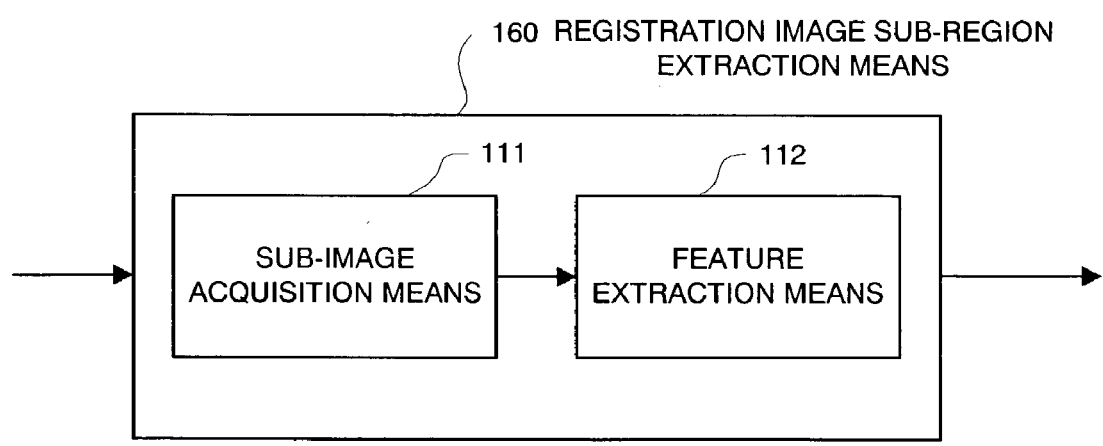
FIG. 24 is a configuration view of registration image sub-region extraction means 160.

Next, the registration image sub-region extraction means 9 will be explained in detail. There is registration image sub-region extraction means 160 of FIG. 24 as one example of the registration image sub-region extraction means 9. The registration image sub-region extraction means 160 includes the sub-image acquisition means 111 and the feature extraction means 112. The operation of the sub-image acquisition means 111 and feature extraction means 112 was already described. The registration image sub-region extraction means 160 generates a by-region dictionary feature vector from the registration image.

Figure 25:
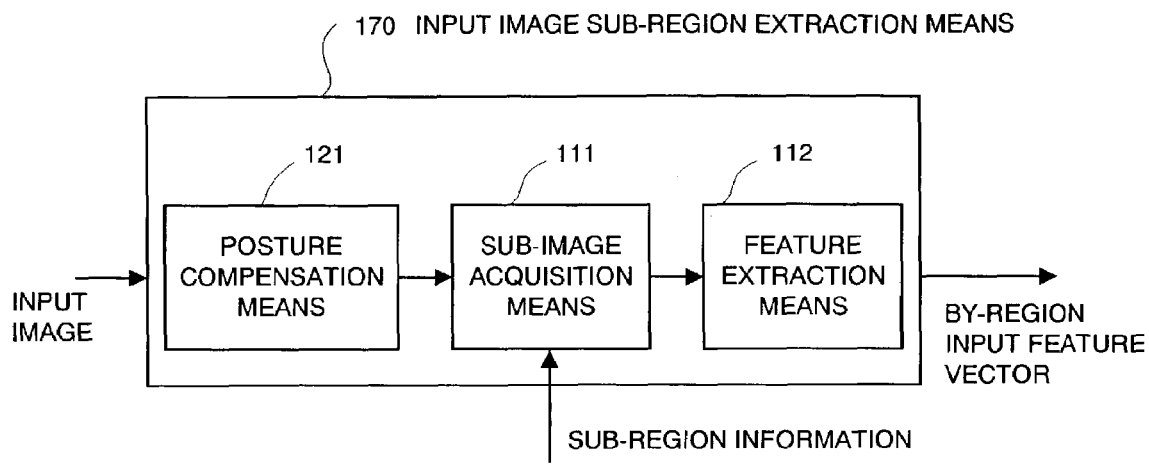
FIG. 25 is a configuration view of registration image sub-region extraction means 170.

There is registration image sub-region extraction means 170 of FIG. 25 as another example of the registration image sub-region extraction means 9. The registration image sub-region extraction means 170 includes the posture compensation means 121, the sub-image acquisition means 111 and the feature extraction means 112. The registration image sub-region extraction means 170 appropriately compensates for the posture of the body in the registration image before extracting the feature by the posture compensation means 121.

A by-region dictionary feature vector is generated, by employing the sub-image acquisition means 111 and the feature extraction means 112 for the image data converted to assume a constant posture by the posture compensation means 121. Compensation of the posture of the registration image allows deterioration in collation precision due to a variation in posture of the body in the image to be improved.

Figure 26:
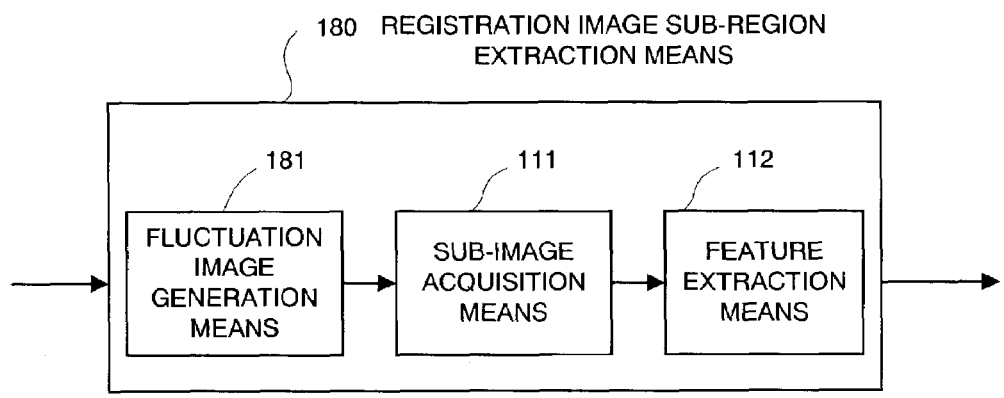
FIG. 26 is a configuration view of registration image sub-region extraction means 180.

There is registration image sub-region extraction means 180 of FIG. 26 as yet another example of the registration image sub-region extraction means 9. The registration image sub-region extraction means 180 includes fluctuation image generation means 181, the sub-image acquisition means 111 and the feature extraction means 112. The fluctuation image generation means 181 converts the registration image, which was input, into a plurality of fluctuation images including the registration image itself. The fluctuation image is an image converted by simulating a variation in visualization of the object, which occurs due to various factors such as a fluctuation in posture and a fluctuation in illumination, for the image that was input.

Figure 28:
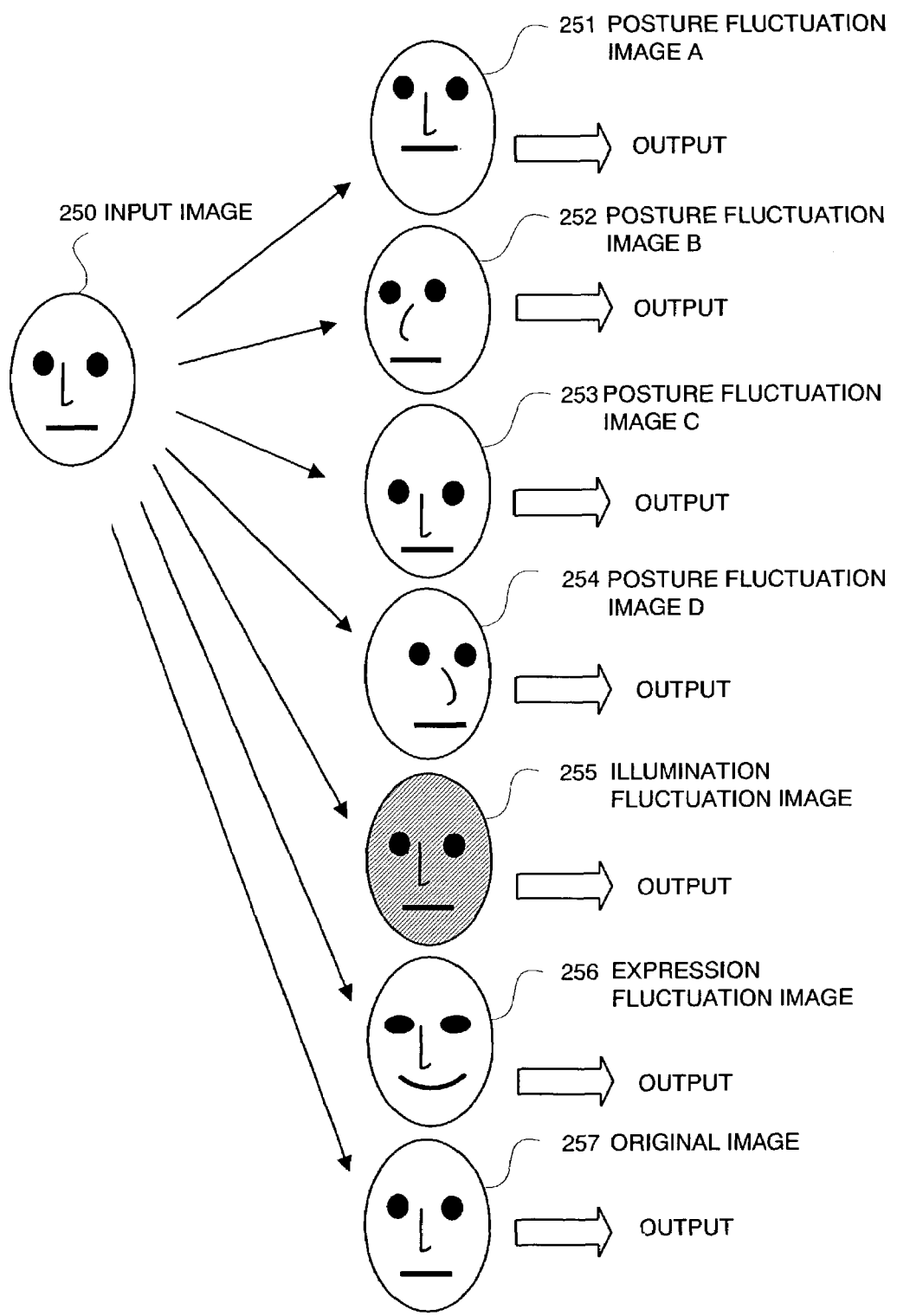
FIG. 28 is a conceptual view illustrating a fluctuation image generation method.
Figure 29:
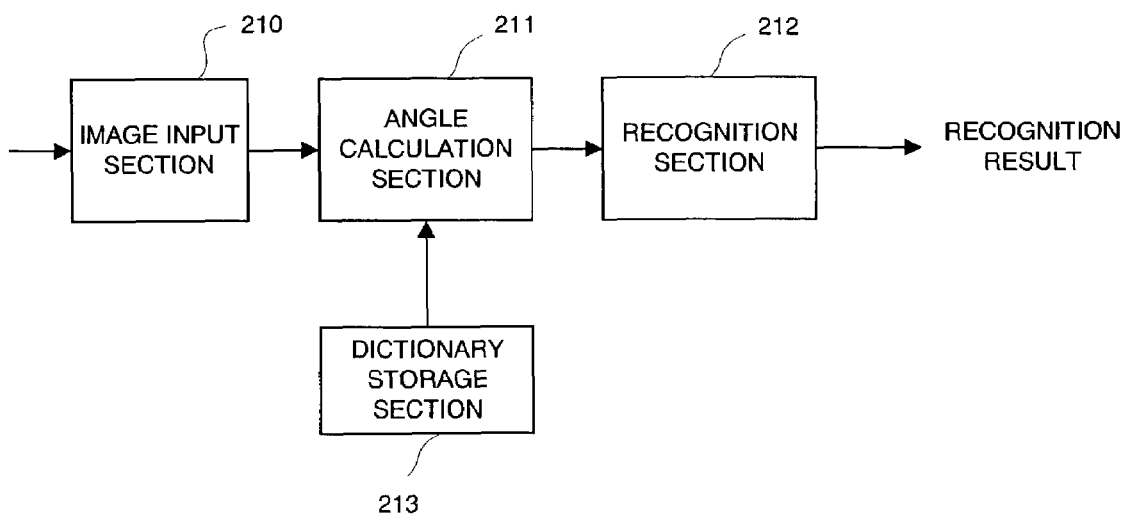
FIG. 29 is a configuration view of one example of the conventional image recognition system.

An example of the fluctuation image having a human face targeted is illustrated in FIG. 28. For the input image 250, seven kinds of the fluctuation images including the input image itself were generated. A posture fluctuation image A 251 is an image converted so that a face pointed upward. A posture fluctuation image B 252 is an image converted so that a face pointed to the right. A posture fluctuation image C 253 is an image converted so that a face pointed downward. A posture fluctuation image D 254 is an image converted so that a face pointed to the left. These posture fluctuation images can be converted by utilizing the method for use in said posture compensation means 121. An illumination fluctuation image 255 is an image having a variation in shading by illumination affixed to the input image 250, which can be realized, for example, by a method of wholly brightening or darkening the pixel value of the input image 250. An expression fluctuation image 256 is an image having the face converted into a smiling face by varying an expression of the face. The conversion method can be realized by applying, for example, such a transformation that both mouths are raised and both eyes are narrowed. An original image 257 has data of the input image as it is.

Also, the fluctuation image generation means 181 can output a plurality of the images having a parameter varied in a plurality of stages even in the same fluctuation. For example, in the event of the right-direction posture fluctuation, three kinds of the conversion images of a 15° right rotation, a 30° right rotation, and a 45° right rotation can be simultaneously output. Also, can be output the image for which was conducted a conversion having different fluctuation factors such as a fluctuation in posture and a fluctuation in illumination combined.

A plurality of fluctuation image groups generated by fluctuation image generation means 181 are converted into a by-region dictionary feature vector group by the sub-image acquisition means 111 and the feature extraction means 112.

The by-region dictionary feature vector group generated by the registration image sub-region extraction means 180 is converted into a plurality of dictionary records by the dictionary data generation means 8, or the principal-component data is generated by dictionary data generation means 190 shown in FIG. 27. In the event that the principal-component data was generated, the input image is collated by the method shown in the conceptual view of FIG. 5.

By finishing the generation of the fluctuation image on the dictionary registration side, even though the posture and illumination circumstances of the body in the input image vary, the collation can be correctly made because the pre-assumed fluctuation image was registered on the registration side.

Figure 15:
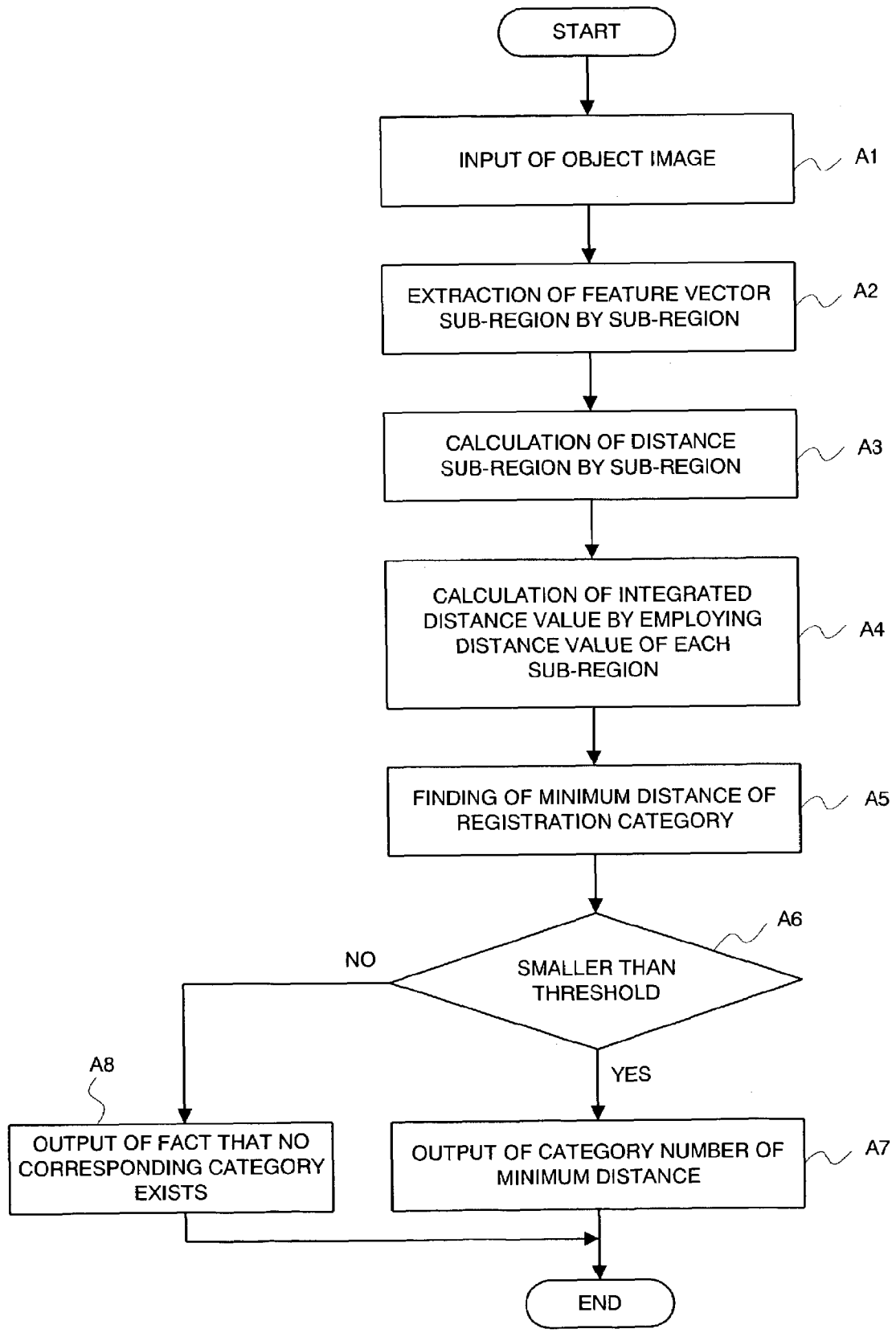
FIG. 15 is a flowchart illustrating a whole operation of the image recognition system relating to the present invention.

Next, a whole operation of this embodiment will be explained in detail by referring to FIG. 15. FIG. 15 is a flowchart illustrating the whole operation of the image recognition system relating to the present invention. At first, input image data of the identification object is input (step A1). Next, the input image is split into P sub-regions, and the feature vector is extracted sub-region by sub-region (step A2). Next, referring to the dictionary data, a distance to the registration image is calculated sub-region by sub-region (step A3). Next, one integrated distance value is calculated by employing the P distance values by sub-region (step A4). The minimum distance value in the registration category is calculated (step A5). Next, it is determined whether the minimum distance value is smaller than the threshold (step A6). When the minimum distance value is smaller than the threshold, a category having the minimum distance value is output as a recognition result (step A7). When the minimum distance value is larger than the threshold, the fact that no corresponding category exists is output (step A8).

Next, an operation of dictionary data learning of this embodiment will be explained in detail by referring to FIG. 16.

Figure 16:
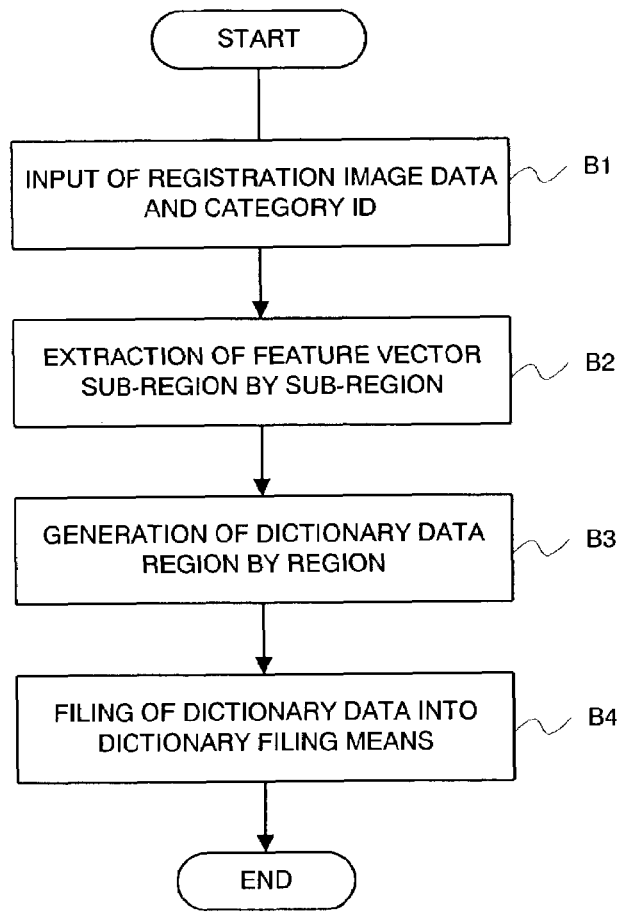
FIG. 16 is a flowchart illustrating an operation of dictionary data learning.

FIG. 16 is a flowchart illustrating the operation of the dictionary data learning. A category ID that corresponds to the registration image data is input (step B1). Next, the registration image is split into P sub-regions (step B2). Next, the dictionary data is generated sub-region by sub-region by employing the image data that belongs to each sub-region (step B3). The dictionary data is preserved in the dictionary data filing means (step B4). The above operation is repeated as long as it is necessary.

Next, a second embodiment of the present invention will be explained in detail by referring to the attached drawings.

Figure 17:
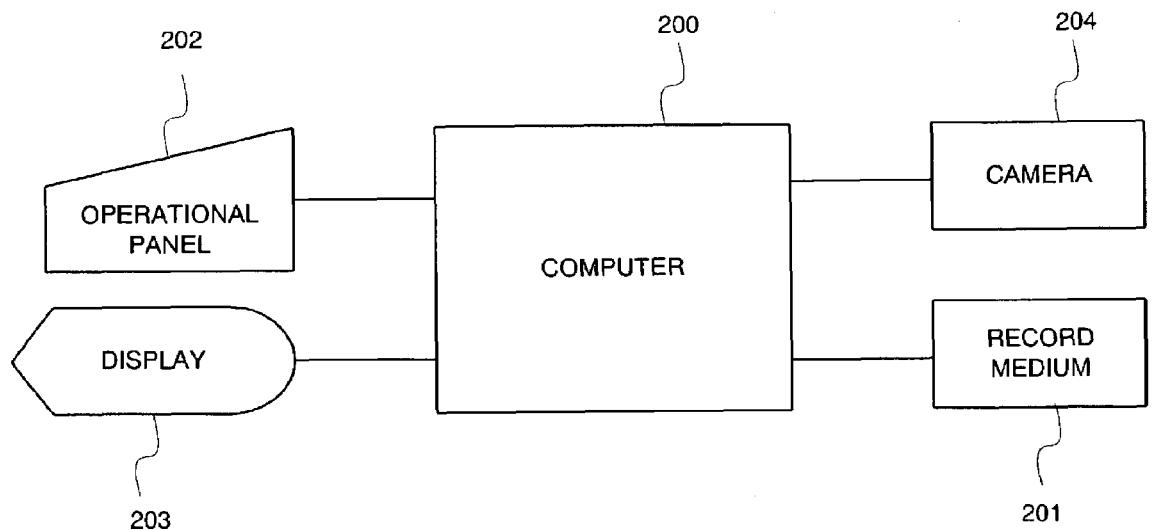
FIG. 17 is a configuration view of a second embodiment of the present invention.

FIG. 17 is a configuration view of the second embodiment of the present invention. The second embodiment of the present invention is configured of a computer 200 that operates under a program control, a record medium 201 in which an image recognition program was recorded, a camera 204, an operational panel 202, and a display 203. This record medium 201 should be a magnetic disk, a semiconductor memory, and the other record medium.

The computer 200 loads and executes a program for materializing the collation section 1, the registration section 7, the dictionary filing means 5, and the sub-region information storage means 6. The program is preserved in the record medium 201, and the computer 200 reads and executes the program from the record medium 201. The program performs the operation shown in the flowcharts of FIG. 15 and FIG. 16. In this embodiment, the input image is input from the camera 204, and a recognition result is indicated on the display 203. An instruction of the recognition and an instruction of the learning are conducted by an operator from the operational panel 202.

In accordance with the image recognition system by the present invention, the collation means is included for calculating an inter-pattern distance between the sub-region of said input image, and the sub-region of said registration image that corresponds hereto, and identifying said input image based on said inter-pattern distance of each sub-region, whereby it becomes possible to correctly classify the input image regardless of a fluctuation in illumination, and a state of occlusion. Also, the image recognition method and the program in accordance with the present invention also take the similar effect to the above-mentioned image recognition system.

Specifically explaining, the effect of the invention is that, by independently collating a plurality of the sub-regions in the image to integrate these results, an influence of a fluctuation in illumination and occlusion can be reduced to correctly identify the input image. Its reason is because the sub-region in which a score becomes abnormal due to a fluctuation in illumination, and occlusion can be excluded at the time of the distance value integration.

The entire disclosure of Japanese Patent Application No. 2002-272601 filed on Feb. 27, 2002 including specification, claims, drawing and summary are incorporated herein by reference in its entirety.

What is claimed is:

1. An image recognition system comprising:
   inter-pattern distance calculation means for calculating inter-pattern distances between an input image and registration images on each sub-region of a plurality of sub-regions;
   inter-pattern distance integration means for selecting a portion of said plurality of sub-regions in an ascending order of said inter-pattern distances and integrating said inter-pattern distances of said selected sub-regions into an integrated inter-pattern distance; and
   identification means for identifying said registration image with minimum integrated inter-pattern distance.

2. An image recognition system comprising:
   fluctuation image generation means for converting a registration image into a plurality of registration images, each of the plurality of registration images differing in visualization due to a variation in posture and a variation in illumination;

subspace distance calculation means for calculating subspace distance values between each of a plurality of sub-regions of an input image, and a plurality of sub spaces of sub-regions of said registration images; and identification means for identifying said input image based on said subspace distance values.

3. An image recognition system comprising:

inter-subspace distance calculation means for calculating, sub-region by sub-region, inter-subspace distance values between each of a plurality of subspaces of sub-regions of an input image that is comprised of a plurality of images, and each of a plurality of subspaces of sub-regions of registration images that are comprised of a plurality of images, the plurality of sub-regions of the registration images corresponding to said plurality of sub-regions of said input image; and identification means for identifying said input image based on said inter-subspace distance values.

4. The image recognition system as set forth in claim 3, wherein said inter-subspace distance calculation means calculates the inter-subspace distance values between a subspace formed by K vectors that is generated from said sub-regions of said registration images, and a subspace formed by L vectors that is generated from said sub-regions of said input images.

5. An image recognition system comprising;

a first fluctuation image generation means for converting a registration image into a plurality of registration images, each differing in visualization due to a variation in posture or a variation in illumination;

a second fluctuation image generation means for converting an input image into a plurality of input images, each differing in visualization due to a variation in posture and a variation in illumination;

inter-subspace distance calculation means for calculating inter-subspace distance values between each of a plurality of sub-regions of said input images, and a plurality of sub-regions of said registration images that correspond to said sub-regions of said input images; and identification means for identifying said input image based on said inter-subspace distance values.

6. The image recognition system as set forth in claim 5, wherein said inter-subspace distance calculation means calculates the inter-subspace distance values between a subspace formed by K vectors that is generated from said sub-regions of said registration images, and a subspace formed by L vectors that is generated from said sub-regions of said input images.

7. An image recognition method comprising using a computer to carry out the steps of:

calculating inter-pattern distance between an input image and registration images on each sub-region of a plurality of sub-regions;

integrating said inter-pattern distances for selecting a portion of said plurality of sub-regions in an ascending order of said inter-pattern distances and integrating said inter-pattern distances of said selected sub-regions into an integrated inter-pattern distance; and identifying said registration image with minimum integrated inter-pattern distance.

8. An image recognition method comprising using a computer to carry out the steps of: converting a registration image into a plurality of registration images, each of the plurality of registration images differing in visualization due to a variation in posture and a variation in illumination;

calculating subspace distance values between each of a plurality of sub-regions of an input image, and a plurality of subspaces of sub-regions of said registration images; and identifying said input image based on said subspace distance values.

9. An image recognition method comprising using a computer to carry out the steps of:

calculating, sub-region by sub-region, inter-subspace distance values between each of a plurality of subspaces of sub-regions of an input image that is comprised of a plurality of images, and each of a plurality of subspaces of sub-regions of registration images that are comprised of a plurality of images, the plurality of sub-regions of the registration images corresponding to said plurality of sub-regions of said input image; and identifying said input image based on said inter-subspace distance values.

10. The image recognition method as set forth in claim 9, wherein said calculating the inter-subspace distance values comprises calculating the inter-subspace distance values between a subspace formed by K vectors that is generated from said sub-regions of said registration images, and a subspace formed by L vectors that is generated from said sub-regions of said input images.

11. An image recognition method comprising using a computer to carry out the steps of:

converting a registration image into a plurality of registration images, each differing in visualization due to a variation in posture or a variation in illumination;

converting an input image into a plurality of input images, each differing in visualization due to a variation in posture and a variation in illumination;

calculating inter-subspace distance values between each of a plurality of sub-regions of said input images, and a plurality of sub-regions of said registration images that correspond to said sub-regions of said input images; and identifying said input image based on said inter-subspace distance values.

12. The image recognition method as set forth in claim 11, wherein said calculating the inter-subspace distance values comprises calculating the inter-subspace distance values between a subspace formed by K vectors that is generated from said sub-regions of said registration images, and a subspace formed by L vectors that is generated from said sub-regions of said input images.

13. A computer readable storage medium storing a program for executing an image recognition method, the method comprising:

calculating inter-pattern distance between an input image and registration images on each sub-region of a plurality of sub-regions;

integrating said inter-pattern distances for selecting a portion of said plurality of sub-regions in an ascending order of said inter-pattern distances and integrating said inter-pattern distances of said selected sub-regions into an integrated inter-pattern distance; and identifying said registration image with minimum integrated inter-pattern distance.

14. A computer readable storage medium storing a program for executing an image recognition method, the method comprising:

converting a registration image into a plurality of registration images, each of the plurality of registration images differing in visualization due to a variation in posture and a variation in illumination;

calculating subspace distance values between each of a plurality of sub-regions of an input image, and a plurality of subspaces of sub-regions of said registration images; and identifying said input image based on said subspace distance values.

15. A computer readable storage medium storing a program for executing an image recognition method, the method comprising:
calculating, sub-region by sub-region, inter-subspace distance values between each of a plurality of subspaces of sub-regions of an input image that is comprised of a plurality of images, and each of a plurality of subspaces of sub-regions of registration images that are comprised of a plurality of images, the plurality of sub-regions of the registration images corresponding to said plurality of sub-regions of said input image; and
identifying said input image based on said inter-subspace distance values.

16. The computer readable storage medium as set forth in claim 15, wherein said calculating the inter-subspace distance values comprises calculating the inter-subspace distance values between a subspace formed by K vectors that is generated from said sub-regions of said registration images, and a subspace formed by L vectors that is generated from said sub-regions of said input images.

17. A computer readable storage medium storing a program for executing an image recognition method, the method comprising:
converting a registration image into a plurality of registration images, each differing in visualization due to a variation in posture and a variation in illumination;
converting an input image into a plurality of input images, each differing in visualization due to a variation in posture or a variation in illumination;
calculating inter-subspace distance values between each of a plurality of sub-regions of said input images, and a plurality of sub-regions of said registration images that correspond to said sub-regions of said input images; and
identifying said input image based on said inter-subspace distance values.

18. The computer readable storage medium as set forth in claim 17, wherein said calculating the inter-subspace distance values comprises calculating the inter-subspace distance values between a subspace formed by K vectors that is generated from said sub-regions of said registration images, and a subspace formed by L vectors that is generated from said sub-regions of said input images.

19. An image recognition system comprising: fluctuation image generation means for converting a registration image into a plurality of registration images, each of the plurality of registration images differing in visualization due to a variation in posture or a variation in illumination;
subspace distance calculation means for calculating subspace distance values between each of a plurality of sub-regions of an input image, and a plurality of subspaces of sub-regions of said registration images; and
identification means for identifying said input image based on said subspace distance values.

20. An image recognition method comprising using a computer to carry out the steps of:
converting a registration image into a plurality of registration images, each of the plurality of registration images differing in visualization due to a variation in posture or a variation in illumination;
calculating subspace distance values between each of a plurality of sub-regions of an input image, and a plurality of subspaces of sub-regions of said registration images; and
identifying said input image based on said subspace distance values.

21. A computer readable storage medium storing a program for executing an image recognition method, the method comprising:
converting a registration image into a plurality of registration images, each of the plurality of registration images differing in visualization due to a variation in posture or a variation in illumination;
calculating subspace distance values between each of a plurality of sub-regions of an input image, and a plurality of subspaces of sub-regions of said registration images; and
identifying said input image based on said subspace distance values.

* * * * *